United States Patent [19]
Jimbo et al.

[11] Patent Number: 5,296,344

[45] Date of Patent: Mar. 22, 1994

[54] SILVER HALIDE PHOTOGRAPHIC LIGHT-SENSITIVE MATERIAL

[75] Inventors: Yoshihiro Jimbo; Toshiyuki Watanabe, both of Kanagawa, Japan

[73] Assignee: Fuji Photo Film Co., Ltd., Kanagawa, Japan

[21] Appl. No.: 895,842

[22] Filed: Jun. 9, 1992

[30] Foreign Application Priority Data

Jun. 11, 1991 [JP] Japan .................................. 3-165171
Jul. 26, 1991 [JP] Japan .................................. 3-208907

[51] Int. Cl.$^5$ ................................................ G03C 1/84
[52] U.S. Cl. ................................ 430/522; 430/510; 430/517; 548/240
[58] Field of Search .................... 430/522, 510, 517; 548/240

[56] References Cited

U.S. PATENT DOCUMENTS 4,904,578  2/1990  Tanaka et al. ...................... 430/522

FOREIGN PATENT DOCUMENTS 0382225  8/1990  European Pat. Off. .
0430186  6/1991  European Pat. Off. .
1794099  9/1968  Fed. Rep. of Germany .

Primary Examiner—Jack P. Brammer
Attorney, Agent, or Firm—Sughrue, Mion, Zinn, Macpeak & Seas

[57] ABSTRACT

There is disclosed a silver halide photographic light-sensitive material containing a dye which colors a specific layer in the light-sensitive material and furthermore is quickly decolored and/or eluted during a development processing. The light-sensitive material contains at least one compound represented by the following formula (1), (2) or (3):

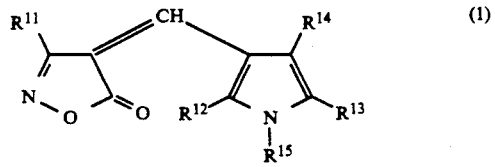

(1)

wherein $R^{11}$ represents a hydrogen atom, an alkyl group, an aryl group, —COOR$^{16}$, or —CONR$^{16}$R$^{17}$; $R^{12}$, $R^{13}$ and $R^{14}$ each represents a hydrogen atom, an alkyl group, and an aryl group; $R^{15}$ represents a hydrogen atom, an alkyl group, an aryl group, or an amino group; $R^{13}$ and $R^{14}$ may be combined to form a 6-membered ring; and $R^{16}$ and $R^{17}$ each represents a hydrogen atom, an alkyl group, and an aryl group; provided that the compound represented by formula (1) does not have a carboxy group or a salt thereof as a substituent;

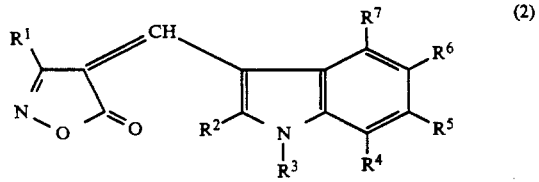

(2)

wherein $R^1$ represents an alkyl group or an aryl group; $R^2$ represents an alkyl group, an aryl group or a hydrogen atom; $R^3$ represents a hydrogen atom or an alkyl group; $R^4$, $R^5$, $R^6$ and $R^7$ each represents a hydrogen atom, an alkyl group, an aryl group, a halogen atom, —OR$^{21}$, —NR$^{21}$R$^{22}$, —N(R$^{21}$)SO$_2$R$^{22}$, —N(R$^{21}$)COR$^{22}$, and —COOR$^{21}$; and $R^{21}$ and $R^{22}$ each represents a hydrogen atom, an alkyl group and an aryl group; provided that the compound represented by formula (2) does not have a carboxy group or a salt thereof as a substituent;

(Abstract continued on next page.)

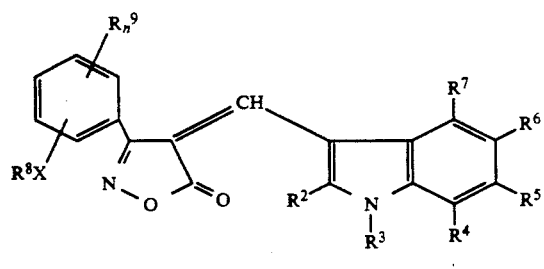

wherein $R^2$, $R^3$, $R^4$, $R^5$, $R^6$ and $R^7$ each represents the same groups as those defined for $R^2$, $R^3$, $R^4$, $R^5$, $R^6$ and $R^7$ in formula (2); X represents —$SO_2NH$—, —$SO_2NH$-CO—, —CONHCO—, or —$SO_2NHSO_2$—; $R^8$ represents an alkyl group, an aryl group or a heterocyclic group; $R^9$ represents a hydrogen atom, an alkyl group, an aryl group, —$OR^{23}$, —$NR^{23}R^{24}$, —$N(R^{23})COR^{24}$, or —$COOR^{23}$; and $R^{23}$ and $R^{24}$ each represents a hydrogen atom, an alkyl group and an aryl group; provided that the compound represented by formula (3) does not have a carboxy group or a salt thereof as a substituent. There is also disclosed a methine dye represented by the above formula (1), (2) or (3).

6 Claims, No Drawings

SILVER HALIDE PHOTOGRAPHIC LIGHT-SENSITIVE MATERIAL

FIELD OF THE INVENTION

The present invention relates to a silver halide photographic light-sensitive material having a colored layer, specifically to a silver halide photographic light-sensitive material having a hydrophilic colloid layer containing a dye which is photochemically inactive and can be readily decolored and/or eluted by a photographic processing.

Further, the present invention relates to a novel methine dye having an isoxazolone nucleus and an indole or pyrrole nucleus.

The present invention relates to a novel methine dye which can be used as a dye, a photographic dye, a dye for a filter use, a recording compound used for an optical information recording medium, a coloring agent used for an organism such as a cell, or an intermediate product thereof.

BACKGROUND OF THE INVENTION

In a silver halide photographic light-sensitive material, coloring of a photographic emulsion layer and/or other hydrophilic colloid layers is often carried out for the purpose of absorbing light of a specific wavelength range.

When it is necessary to control the spectral composition of light incident to a photographic emulsion layer, a colored layer is usually provided farther from a support than the photographic emulsion layer. Such colored layer is called a filter layer. If plural photographic emulsion layers are involved, the filter layer may be interposed therebetween.

For the purpose of preventing blurring of an image, that is, halation caused by light which is scattered in or after passing through a photographic emulsion layer and is reflected on an interface between the emulsion layer and support or a surface of a light-sensitive material on a support side opposite to the emulsion layer to enter the photographic emulsion layer once again, a colored layer which is called an anti-halation layer is provided between the photographic emulsion layer and the support, or on a side of the support opposite to the photographic emulsion layer. When plural photographic emulsion layers are involved, the anti-halation layer may be interposed therebetween.

The photographic emulsion layer is sometimes colored in order to prevent the degradation of an image sharpness (in general, this phenomenon is called an irradiation) caused by a light scattered in the photographic emulsion layer.

Dyes are usually incorporated into these hydrophilic colloid layers to be colored. These dyes are requested to satisfy the following conditions:

(1) having an appropriate spectral absorption according to use purposes;

(2) photochemically inactive, that is, not giving bad side effects, for example, reduction of sensitivity, degradation of latent image, and fogging, to the characteristics of a silver halide photographic emulsion layer in a chemical sense;

(3) bleached in photographic processing steps or eluted in a processing solution or washing water to leave no harmful color on a processed photographic light-sensitive layer;

(4) not diffusing from a colored layer to the other layers; and (5) having an excellent aging stability in a solution or a photographic material and not discoloring and fading.

In particular, where a colored layer is a filter layer or an anti-halation layer provided on the same side of a support as a photographic emulsion layer, it is necessary in many cases that those layers are selectively colored and that the other layers are not substantially colored, because otherwise not only a harmful spectral effect is exerted to the other layers but also an effect as a filter layer or an anti-halation layer is reduced. As a matter of fact, however, a layer containing a dye contacts the other hydrophilic colloid layers in a wet condition to often permit a part of the dye to diffuse from the former to the latter. Many efforts have so far been made in order to prevent such diffusion of the dye.

For example, methods are disclosed in U.S. Pat. Nos. 2,548,564, 4,124,386 and 3,625,694, in which a hydrophilic polymer having a charge opposite to a dissociated anionic dye as a mordant is incorporated into a layer to localize the dye in a specific layer by means of an interaction with a dye molecule.

Further, the methods in which a specific layer is colored with a water insoluble solid dye are disclosed in JP-A-56-12639 (the term "JP-A" as used herein means an unexamined published Japanese patent application), JP-A-55-155350, JP-A-55-155351, JP-A-63-27838, and JP-A-63-197943, European Patents 15,601, 274,723, 276,566 and 299,435, U.S. Pat. No. 4,803,150, and International Patent WO88/04794.

Compound 52 described in JP-A-1-307363 is scarcely soluble in oil and difficult to disperse.

Further, the methods in which a specific layer is colored with metal salt fine particles adsorbing a dye are disclosed in U.S. Pat. Nos. 2,719,088, 2,496,841 and 2,496,843, and JP-A-60-45237.

However, when these improved methods are applied, it is difficult to prevent stain contamination caused by the residual dye due to a slow decoloring and/or eluting speed in development processing if there is involved the change of various factors such as a conversion to a rapid processing, an improvement in a composition of a processing solution and an improvement in a composition of a photographic emulsion.

Meanwhile, the dyes in which an acid nucleus and a 5-membered heterocyclic ring are combined via a methine chain are described in JP-A-54-118247, JP-A-55-155351, JP-A-62-242933, JP-A-1-196040, JP-A-1-196041, JP-A-2-165135, JP-A-2-168250, JP-A-3-14438, and JP-A-3-167546, JP-B-60-662 (the term "JP-B" as used herein means an examined Japanese patent publication) and JP-B-48-42175, and U.S. Pat. Nos. 2,622,980 and 3,441,563. However, there are not described the compounds in which isoxazolone as an acid nucleus and indole as a 5-membered heterocyclic ring nucleus are combined via a methine chain.

Further, the dyes described in the above patents are mainly the compounds which are aimed at adding to a photographic material in the form of a water soluble compound or a dispersion of solid fine grains, and it is difficult to add them to a photographic material in the form of an oil composition and/or a polymer latex composition.

For example, when it is attempted to add the compounds described in JP-A-3-167546 (European Patent 0430186) in the form of an oil composition, there are involved the problems that a desired concentration can not be obtained because of a low solubility of the compounds to an oil and that a roughness generates on a surface.

Further, where a dye is added in the form of a dispersion of solid fine grains, it is difficult in many cases to control an absorption wavelength and wave form of the dye. In particular, where it is used for a filter layer in which a sharp absorption property is requested, it is still more difficult.

There are known as a methine compound having an isoxazolone nucleus and an indole nucleus, the compounds described in Angew. Chem., vol. 90, pp. 643 (1978). However, no applications as a dye are known.

SUMMARY OF THE INVENTION

An object of the present invention is to provide a photographic light-sensitive material containing a dye as an oil or polymer latex composition, which colors a specific layer in a photographic light-sensitive material and furthermore is quickly decolored and/or eluted during a development processing.

As the result of various investigations made by the present inventors, it has been found that the object of the present invention can be achieved by a silver halide photographic light-sensitive material containing at least one compound represented by the following formula (1):

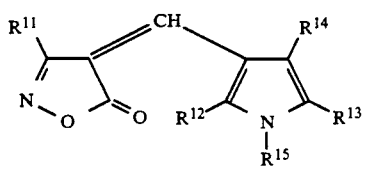

wherein $R^{11}$ represents a hydrogen atom, an alkyl group, an aryl group, —$COOR^{16}$, or —$CONR^{16}R^{17}$; $R^{12}$, $R^{13}$ and $R^{14}$ each represents a hydrogen atom, an alkyl group, and an aryl group; $R^{15}$ represents a hydrogen atom, an alkyl group, an aryl group, or an amino group; $R^{13}$ and $R^{14}$ may be combined to form a 6-membered ring; and $R^{16}$ and $R^{17}$ each represents a hydrogen atom, an alkyl group, and an aryl group; provided that the compound represented by formula (1) does not have a carboxy group or a salt thereof as a substituent.

Of the dyes represented by formula (1), preferred are the dyes represented by the following formula (2):

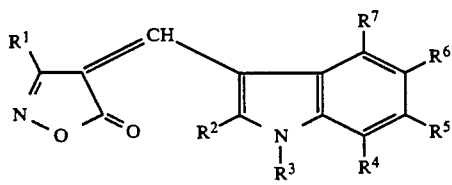

wherein $R^1$ represents an alkyl group or an aryl group; $R^2$ represents an alkyl group, an aryl group or a hydrogen atom; $R^3$ represents a hydrogen atom or an alkyl group; $R^4$, $R^5$, $R^6$ and $R^7$ each represents a hydrogen atom, an alkyl group, an aryl group, a halogen atom, —$OR^{21}$, —$NR^{21}R^{22}$, —$N(R^{21})SO_2R^{22}$, —$N(R^{21})COR^{22}$, and —$COOR^{21}$; and $R^{21}$ and $R^{22}$ each represents a hydrogen atom, an alkyl group and an aryl group; provided that the compound represented by formula (2) does not have a carboxy group or a salt thereof as a substituent.

Of the dyes represented by formula (2), particularly preferred are the compounds in which $R^1$ is a phenyl group or a substituted phenyl group and/or the dyes represented by formula (3):

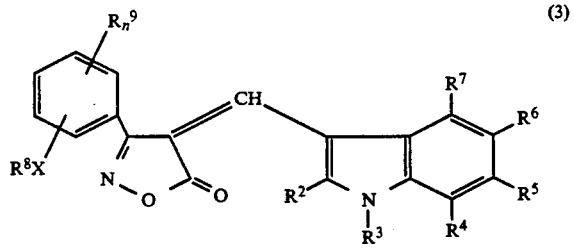

wherein $R^2$, $R^3$, $R^4$, $R^5$, $R^6$ and $R^7$ each represents the same groups as those defined for $R^2$, $R^3$, $R^4$, $R^5$, $R^6$ and $R^7$ in formula (2); X represents —$SO_2NH$—, —$SO_2NH$-$CO$—, —$CONHCO$—, or —$SO_2NHSO_2$—; $R^8$ represents an alkyl group, an aryl group or a heterocyclic group; $R^9$ represents a hydrogen atom, an alkyl group, an aryl group, —$OR^{23}$, —$NR^{23}R^{24}$, —$N(R^{23})COR^{24}$, or —$COOR^{23}$; and $R^{23}$ and $R^{24}$ each represents a hydrogen atom, an alkyl group and an aryl group; provided that the compound represented by formula (3) does not have a carboxy group or a salt thereof as a substituent.

DETAILED DESCRIPTION OF THE INVENTION

Next, the dyes of the present invention represented by formulas (1), (2) and (3) are explained in detail.

In the compounds of formula (1) used in the present invention, the alkyl group represented by $R^{11}$ may have a substituent such as a halogen atom, an alkoxycarbonyl group, an alkoxy group, and an aryloxy group and is preferably a substituted or unsubstituted alkyl group having 1 t 8 carbon atoms, for example, preferably methyl, ethyl, n-butyl, tert-butyl, 1-methyl cyclopropyl, chloromethyl, trifluoromethyl, and ethoxycarbonylmethyl.

The aryl group represented by $R^{11}$ may have a substituent such as a halogen atom, an alkoxy group, an amido group, a carbamoyl group, a sulfonamido group, a sulfamoyl group, an acylsulfamoyl group, a sulfonylcarbamoyl group, a sulfonimido group, and an imido group and is preferably a substituted or unsubstituted aryl group having 6 to 16 carbon atoms, for example, preferably phenyl, 4-methoxyphenyl, 4-acetylaminophenyl, 4-methanesulfonamidophenyl, and 4-benzenesulfonamidophenyl.

The alkyl group represented by $R^{12}$, $R^{13}$ and $R^{14}$ is preferably an alkyl group having 1 to 8 carbon atoms, for example, particularly preferably methyl and ethyl.

The aryl group represented by $R^{12}$, $R^{13}$ and $R^{14}$ is preferably an aryl group having 6 to 10 carbon atoms, for example, preferably phenyl.

The alkyl group represented by $R^{15}$ may have a substituent such as a halogen atom, an alkoxy group, an alkoxycarbonyl group, an acyloxy group, an amido group, a carbamoyl group, a cyano group, and an amino group and is preferably a substituted or unsubstituted alkyl group having 1 to 18 carbon atoms, for example, preferably methyl, ethyl, ethoxycarbonylmethyl, 2-cyanoethyl, 2-propionylaminoethyl, dimethylaminomethyl, di(methoxycarbonylmethyl)aminopropyl, benzyl, and phenylethyl.

The aryl group represented by $R^{15}$ may have a substituent such as a halogen atom, an alkoxy group, an alkoxycarbonyl group, an acyloxy group, an amido group, a carbamoyl group, a cyano group, and an amino group and is preferably a substituted or unsubstituted aryl group having 6 to 22 carbon atoms, for example, preferably phenyl, 2-methoxy-5-ethoxycarbonylphenyl, 4-{di(ethoxycarbonylmethyl)amino}carbonylphenyl, 4-acetylsulfamoylphenyl, 4-propionylsulfamoylphenyl, and 4-methanesulfonamidophenyl.

The amino group represented by $R^{15}$ is preferably a dialkylamino group, for example, preferably dimethylamino, diethylamino, and pyrrolidino.

The 6-membered ring formed by $R^{13}$ and $R^{14}$ is preferably a benzene ring.

The alkyl group represented by $R^{16}$ and $R^{17}$ may have a substituent such as a halogen atom, an alkoxy group, an alkoxycarbonyl group, an acyloxy group, an amido group, a carbamoyl group, a hydroxyl group, a sulfonamido group, a sulfamoyl group, and an amino group and is preferably a substituted or unsubstituted alkyl group having 1 to 12 carbon atoms, for example, preferably methyl, ethyl, ethoxycarbonylmethyl, hydroxyethyl, hydroxyethoxyethyl, dodecyl, cyclohexyl, methanesulfonamidoethyl, cyanoethyl, 2,2,3,3-tetrafluoropropyl, chloroethyl, acetoxyethyl, and dimethylaminomethyl.

The aryl group represented by $R^{16}$ and $R^{17}$ may have a substituent such as a halogen atom, an alkoxy group, an alkoxycarbonyl group, an acyloxy group, a cyano group, a nitro group, an amido group, a sulfonamido group, and a hydroxyl group and is preferably a substituted or unsubstituted aryl group having 6 to 12 carbon atoms, for example, preferably phenyl, 4-methylphenyl, and 4-acetylsulfamoylphenyl.

Preferred as substituents are groups having a dissociative proton, such as an acylsulfamoyl group, a sulfonamido group, an arylsulfonylaminocarbonyl group, an alkylsulfonylaminocarbonyl group, a sulfonimido group, and a group substituted therewith.

In formulas (2) and (3), the alkyl group represented by $R^1$ is preferably a substituted or unsubstituted alkyl group having 1 to 8 carbon atoms, for example, preferably methyl, ethyl, isopropyl, butyl, tert-butyl, 1-methylcyclopropyl, chloromethyl, trifluoromethyl, and ethoxycarbonylmethyl.

The aryl group represented by $R^1$ is preferably a substituted or unsubstituted aryl group having 6 to 16 carbon atoms, and preferred is a phenyl group or a substituted phenyl group. Preferred are, for example, 4-methoxyphenyl and 4-acetylaminophenyl. A particularly preferred substituted phenyl group is a phenyl group having at least one of $R^8X$ and $R^9$ as a substituent.

The alkyl group represented by $R^2$ is preferably an alkyl group having 1 to 8 carbon atoms, for example, particularly preferably methyl.

The aryl group represented by $R^2$ is preferably a phenyl group.

The alkyl group represented by $R^3$ is preferably a substituted or unsubstituted alkyl group having 1 to 15 carbon atoms, for example, preferably methyl, ethyl, propyl, isopropyl, butyl, dodecyl 2-cyanoethyl, 2-ethoxycarbonylethyl, tert-butoxycarbonylmethyl, 2-isobutoxycarbonylethyl, 2-propionylaminoethyl, 3-benzenesulfonamidopropyl, dimethylaminomethyl, di(methoxycarbonylmethyl)aminomethyl, di(methoxycarbonylethyl)aminopropyl, di(methoxycarbonylmethyl)aminocarbonylethyl, and acetoxyethoxycarbonylethyl.

The alkyl group represented by $R^4$, $R^5$, $R^6$ and $R^7$ is preferably an alkyl group having 1 to 8 carbon atoms, preferably methyl and ethyl.

The aryl group represented by $R^4$, $R^5$, $R^6$ and $R^7$ is preferably a phenyl group.

The alkyl group represented by $R^{21}$, $R^{22}$, $R^{23}$ and $R^{24}$ is preferably a substituted or unsubstituted alkyl group having 1 to 8 carbon atoms, for example, preferably methyl, ethyl, propyl, butyl, isobutyl, sec-butyl, tert-butyl, cyclohexyl, methoxyethyl, ethoxyethyl, ethoxycarbonylmethyl, ethoxycarbonylethyl, cyanoethyl, dimethylaminoethyl, hydroxyethyl, methanesulfonamidoethyl, 2,2,3,3-tetrafluoropropyl, chloroethyl, bromoethyl, and acetoxyethyl.

The aryl group represented by $R^{21}$, $R^{22}$, $R^{23}$ and $R^{24}$ is preferably a substituted or unsubstituted aryl group having 6 to 18 carbon atoms, for example, preferably phenyl, 2-acetamidophenyl, 4-methylphenyl, 4-methoxyphenyl, and 4-nitrophenyl, 2-methanesulfonamidophenyl.

A linkage group represented by X is $-SO_2NH-$, $-SO_2NHCO-$, $-SO_2NHSO_2-$, or $-CONHCO-$. Particularly preferred is $-SO_2NH-$ or $-SO_2NHCO-$.

The alkyl group represented by $R^8$ is preferably a substituted or unsubstituted alkyl group having 1 to 12 carbon atoms, for example, preferably methyl, ethyl, propyl, butyl, octyl, 10-camphor-10-yl, 1-ethoxycarbonylpropyl, 1-butoxycarbonylpropyl, 2-chloroethyl, and 2-methoxyethyl.

The aryl group represented by $R^8$ is preferably a substituted or unsubstituted aryl group having 6 to 15 carbon atoms, for example, preferably phenyl, naphthyl, 4-chlorophenyl, 4-methylphenyl, 2,5-dimethylphenyl, mesitylenyl, 4-methoxyphenyl, 3,5-di(methoxycarbonyl)-phenyl, 4-acetamidophenyl, and 4-acetamido-3-methoxyphenyl.

A halogen atom represented by $R^4$, $R^5$, $R^6$ and $R^7$ preferably is a fluorine atom, a chlorine atom and a bromine atom.

The alkyl group represented by $R^9$ is preferably an alkyl group having 1 to 8 carbon atoms, for example, preferably methyl and ethyl.

The aryl group represented by $R^9$ is preferably an aryl group having 6 to 12 carbon atoms, for example, preferably phenyl.

Where the dye of the present invention is used as a dye for a photographic use, the applications thereof are anti-irradiation, anti-halation and a filter.

Where the dye used in the present invention is used as an oil composition and/or a polymer latex composition, the dye preferably does not have a sulfonic acid group, a sulfonate group or a carbonate group as a substituent and has a high solubility in an organic solvent having a boiling point of about 30° to about 150° C., for example, lower alkyl acetate such as ethyl acetate and butyl acetate, ethyl propionate, secondary butyl alcohol, methyl isobutyl ketone, β-ethoxyethyl acetate, and methylcellosolve acetate, and a solvent which is soluble in water, for example, alcohol such as methanol and ethanol.

The concrete examples of the compounds of the present invention are shown below but the present invention is not limited thereto.

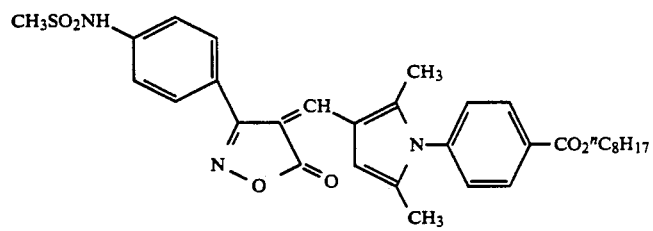
D-1
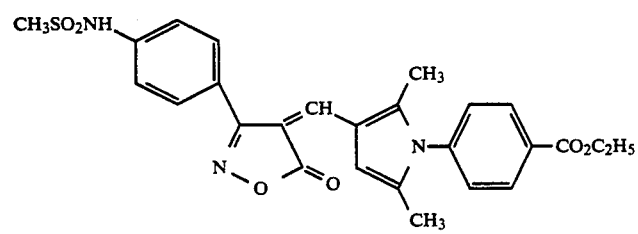
D-2
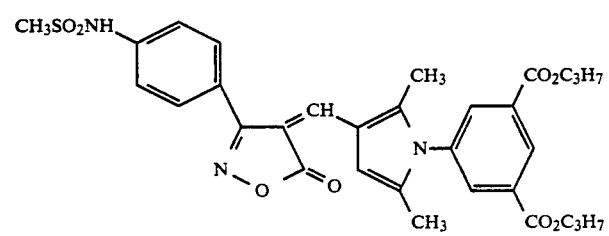
D-3
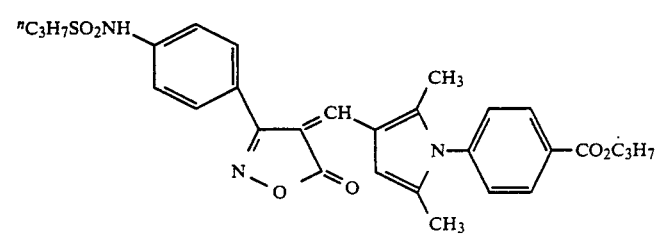
D-4
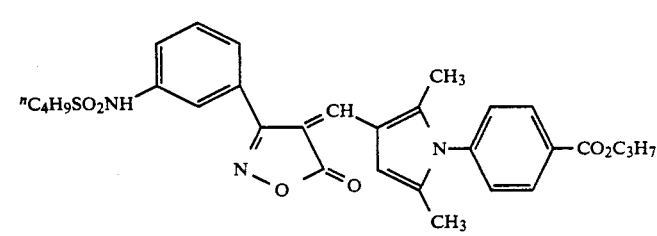
D-5
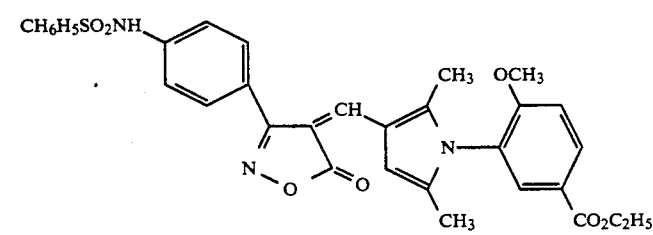
D-6
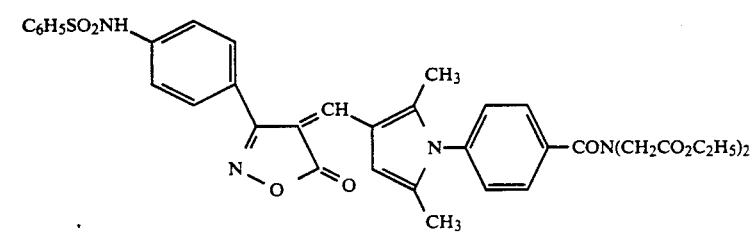
D-7

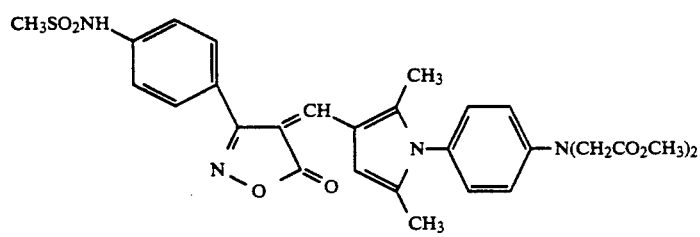
D-8
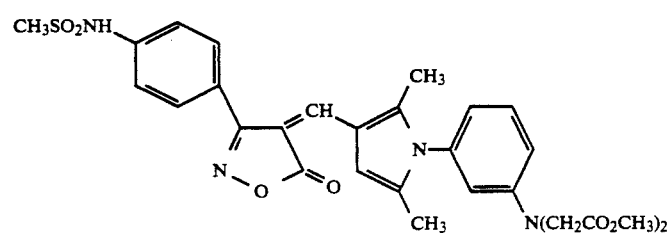
D-9
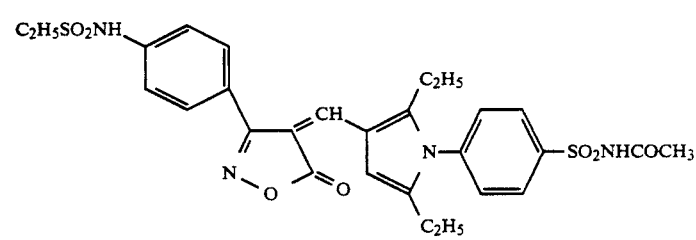
D-10
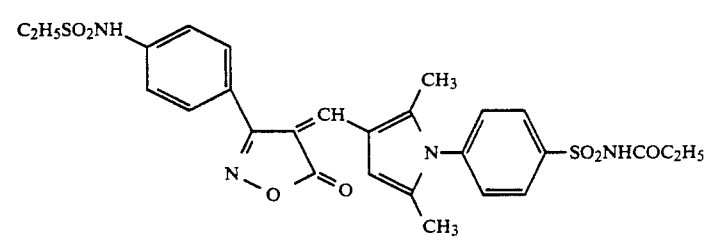
D-11
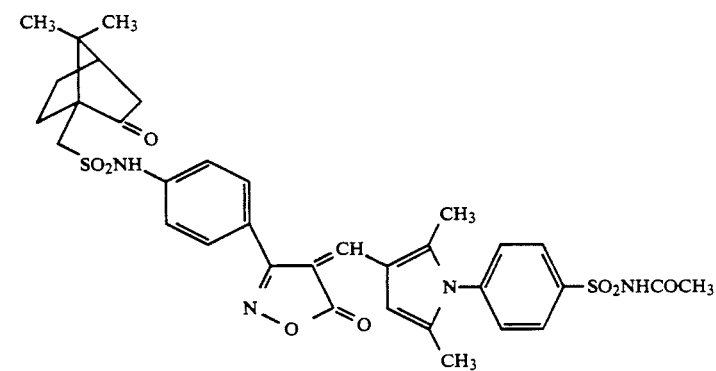
D-12
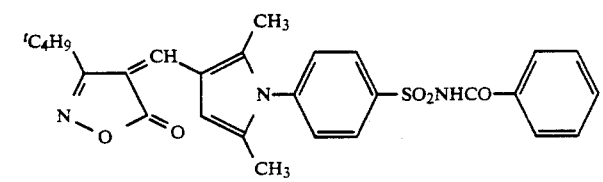
D-13

-continued
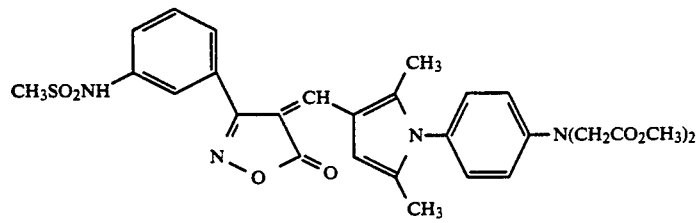
D-14
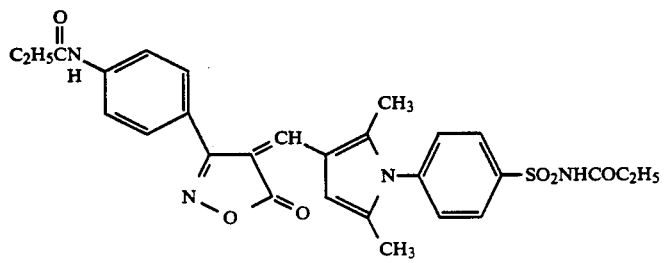
D-15
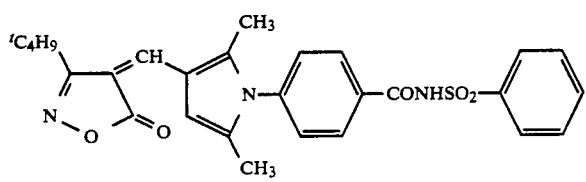
D-16
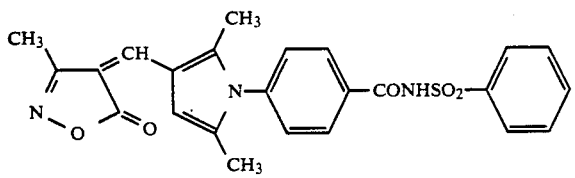
D-17
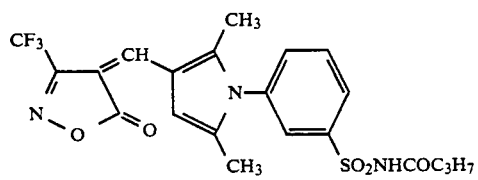
D-18
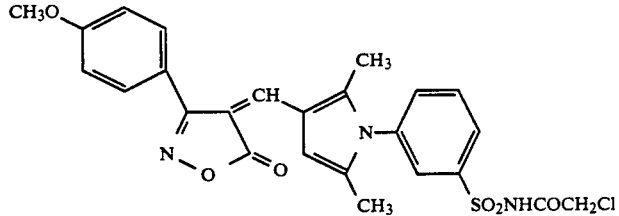
D-19
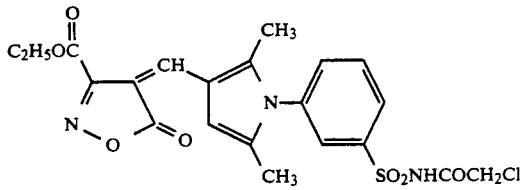
D-20

-continued
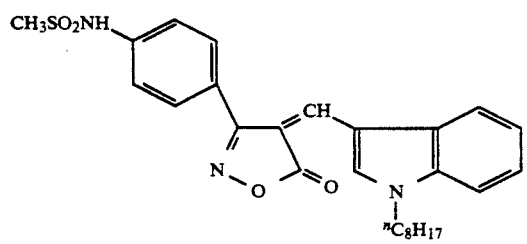 D-21
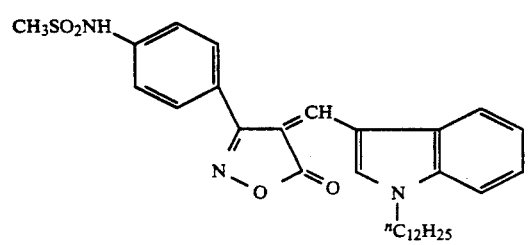 D-22
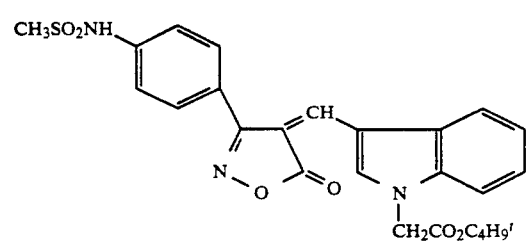 D-23
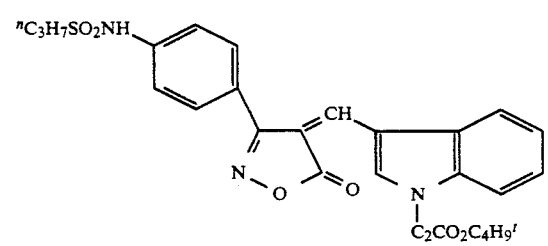 D-24
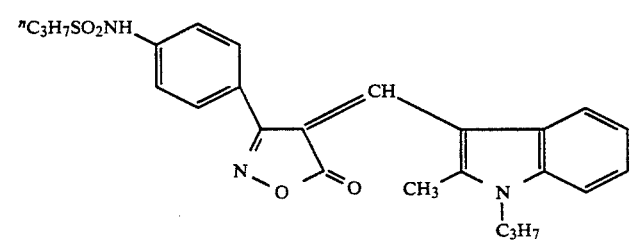 D-25
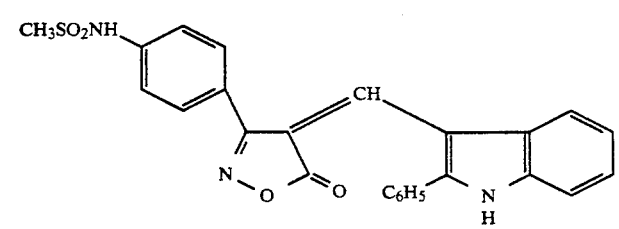 D-26

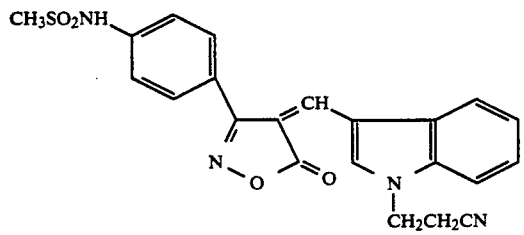
D-27
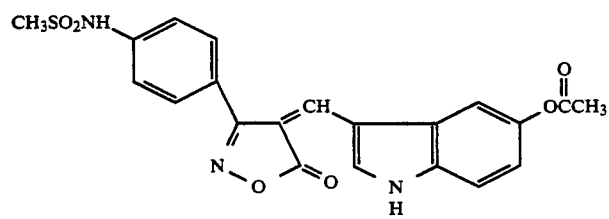
D-28
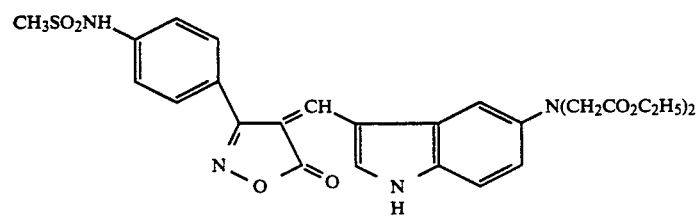
D-29
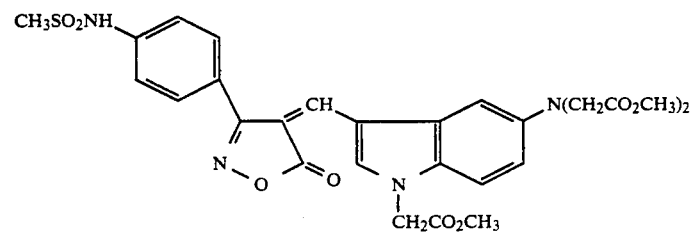
D-30
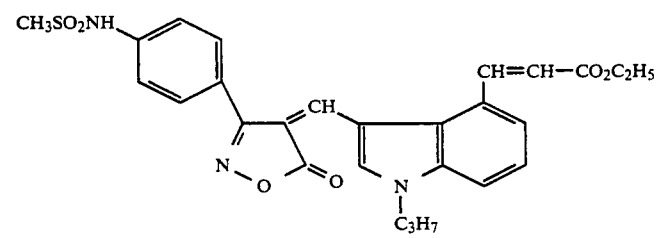
D-31
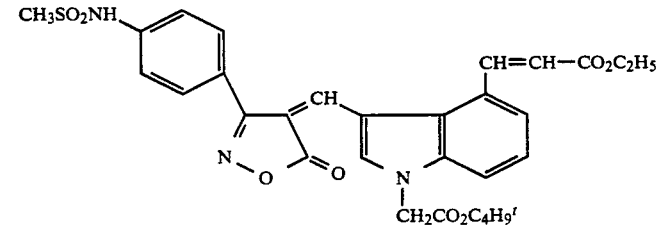
D-32
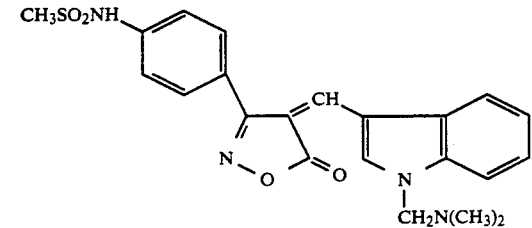
D-33

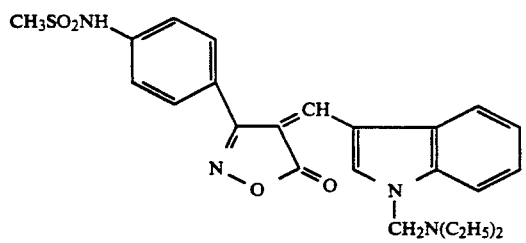
D-34
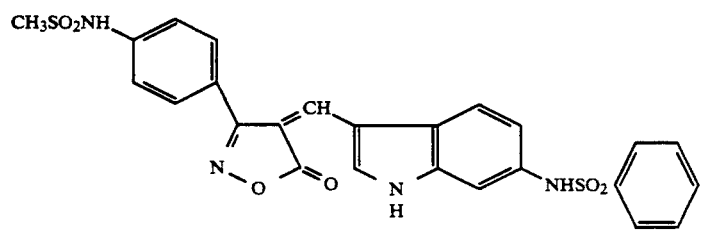
D-35
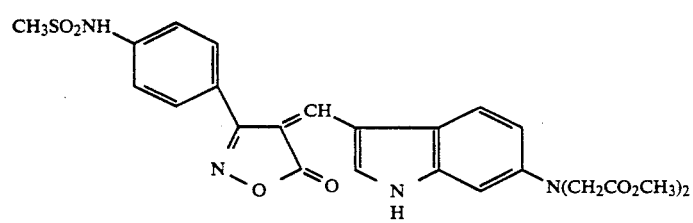
D-36
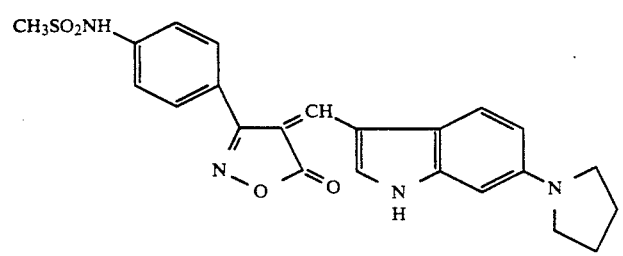
D-37
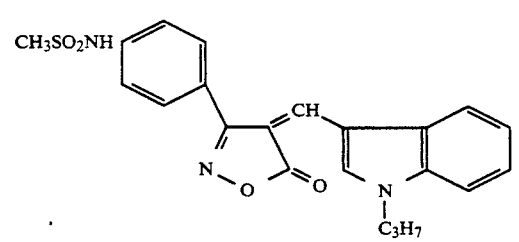
D-38
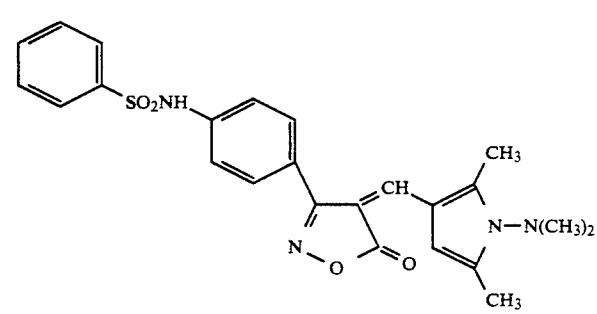
D-39

-continued
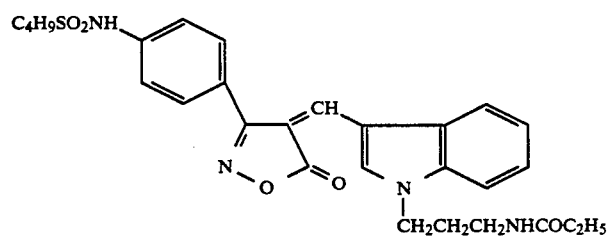 D-40
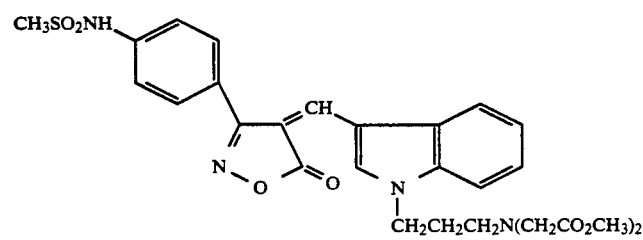 D-41
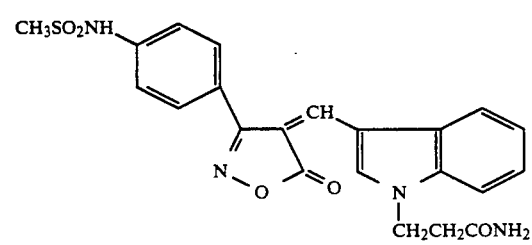 D-42
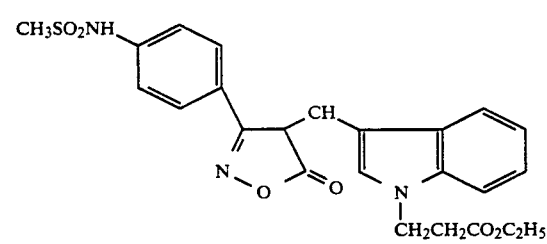 D-43
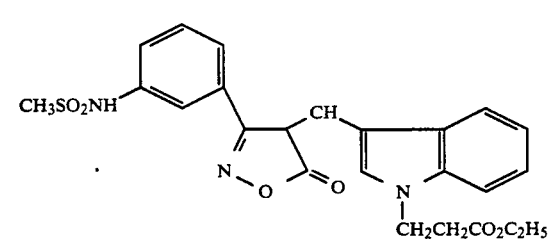 D-44
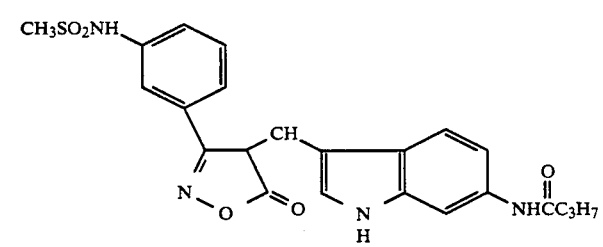 D-45

D-46
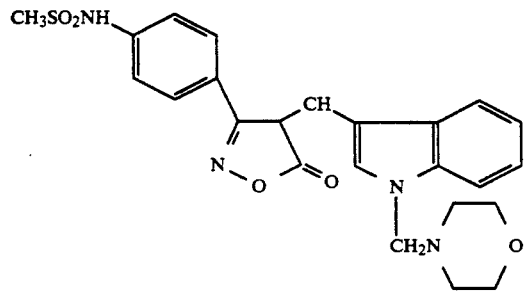
D-47
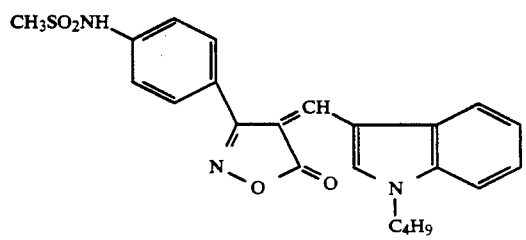
D-48
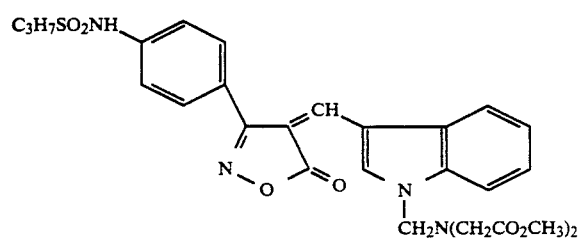
D-49
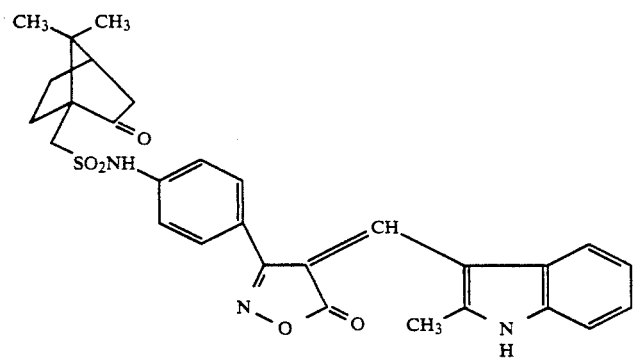
D-50
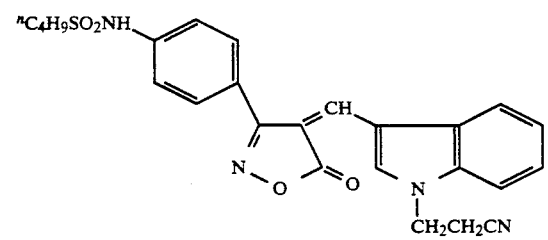
D-51
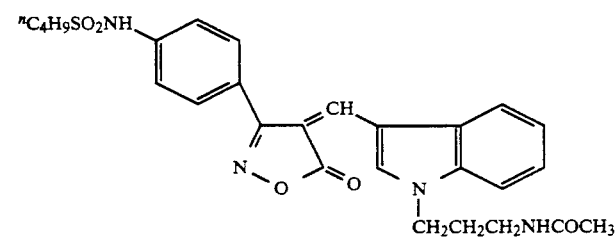

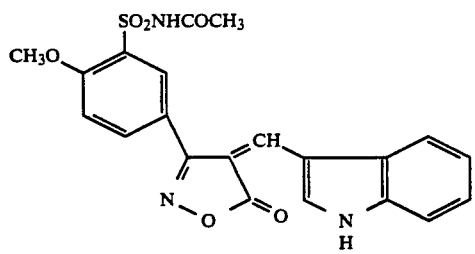
D-52
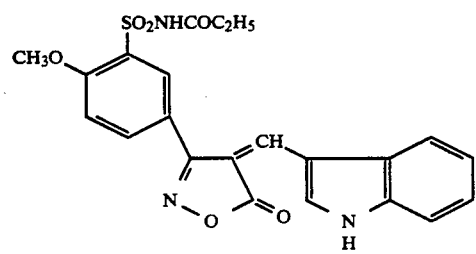
D-53
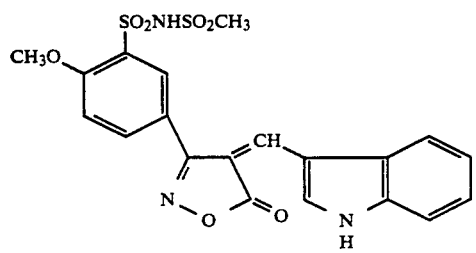
D-54
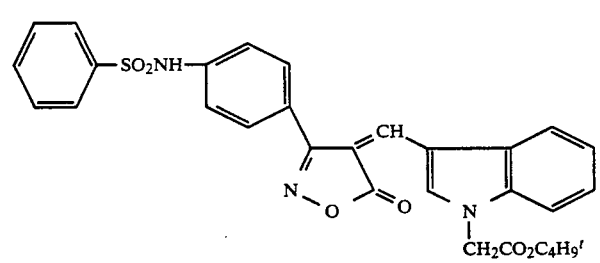
D-55
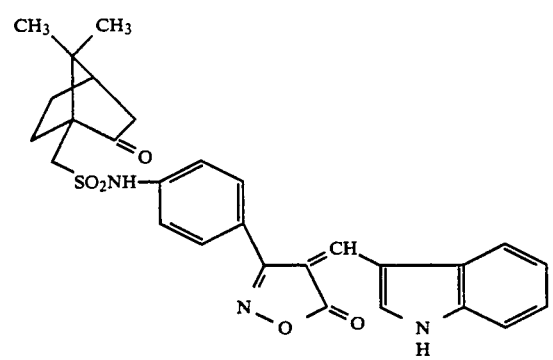
D-56
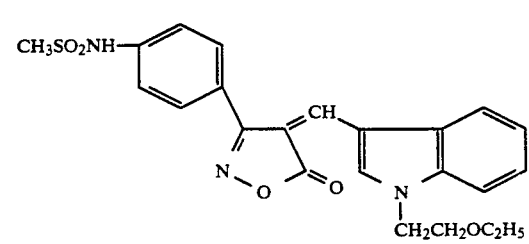
D-57

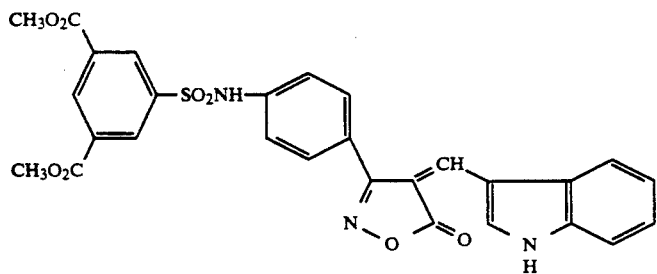
D-58
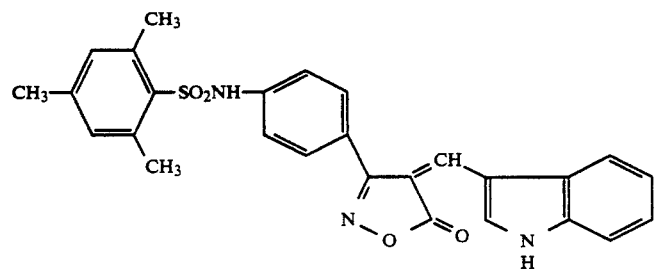
D-59
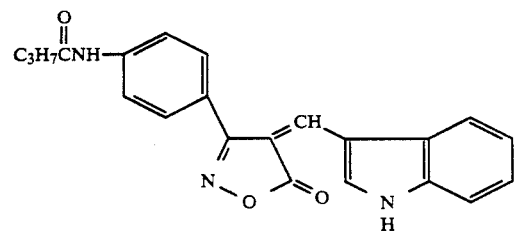
D-60
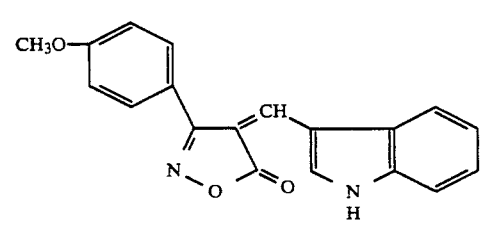
D-61
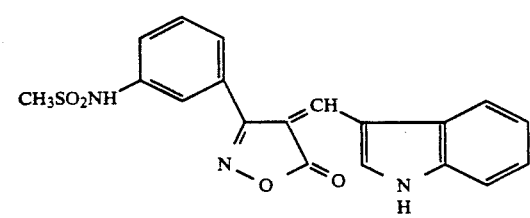
D-62
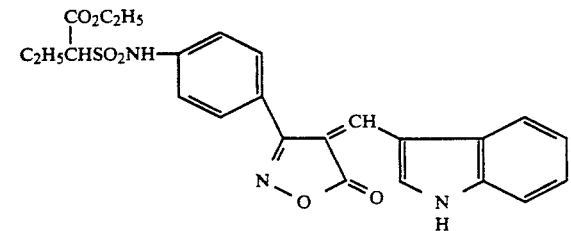
D-63

-continued
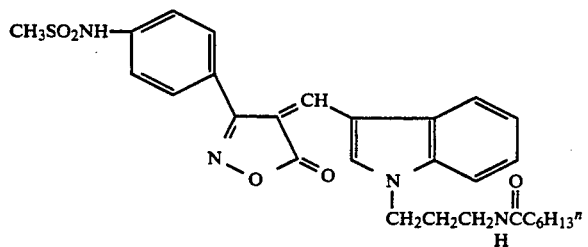
D-64
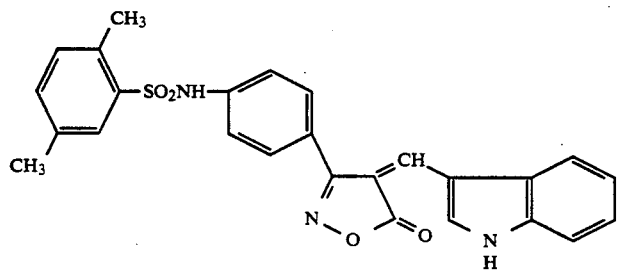
D-65
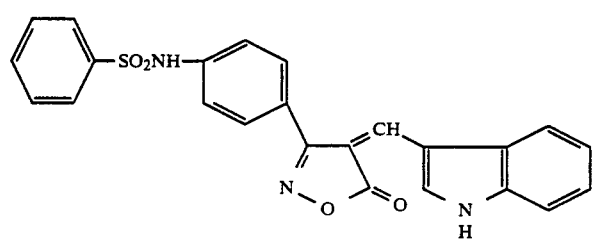
D-66
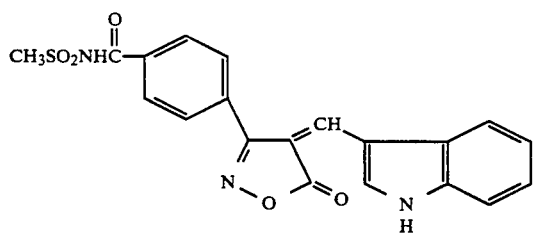
D-67
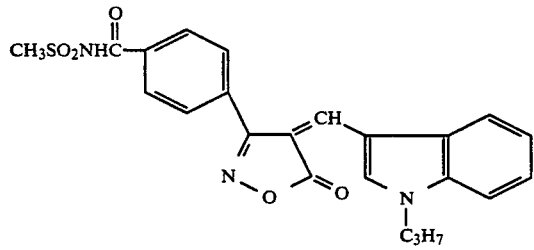
D-68
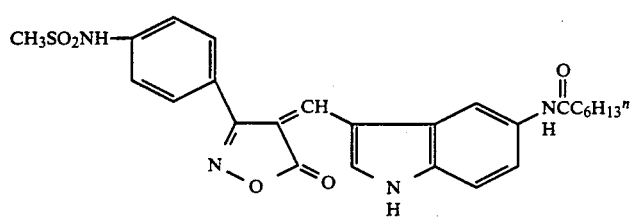
D-69

-continued
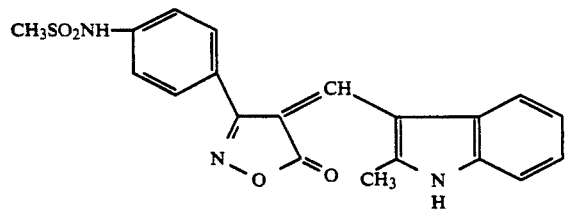 D-70
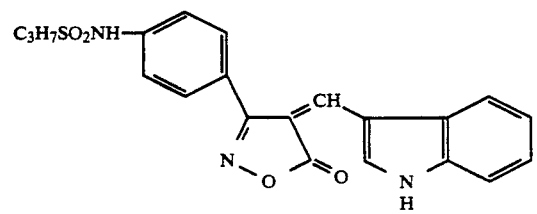 D-71
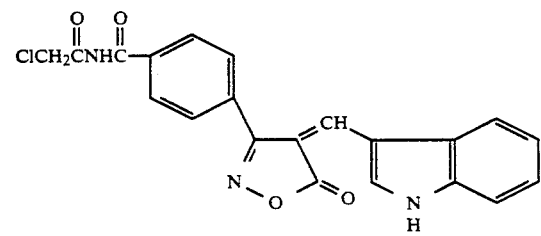 D-72
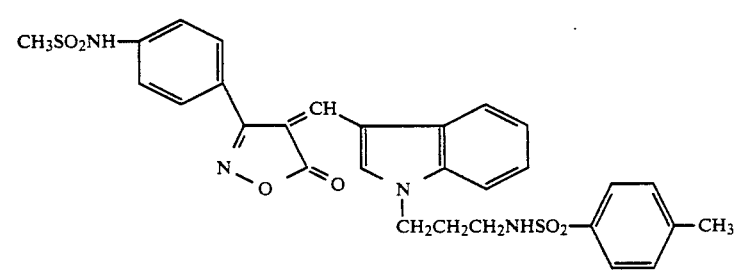 D-73
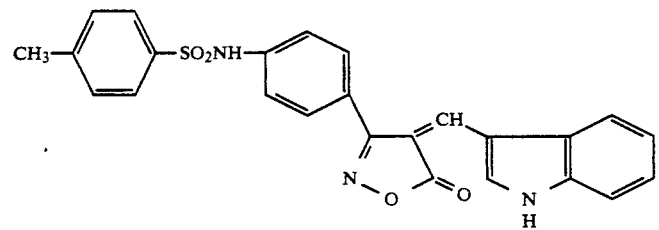 D-74
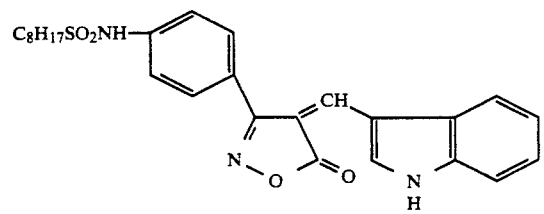 D-75

-continued
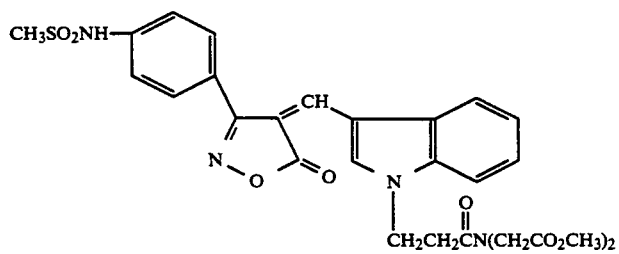
D-76
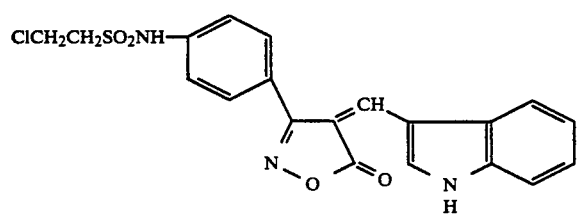
D-77
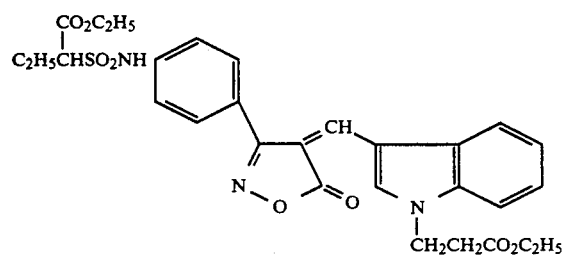
D-78
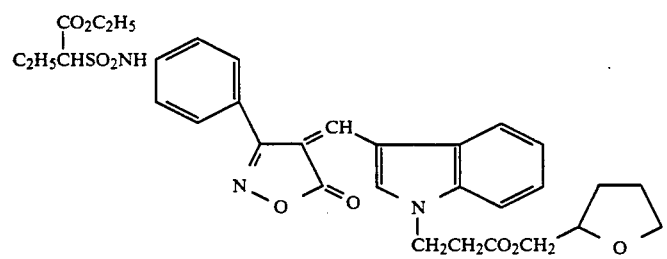
D-79
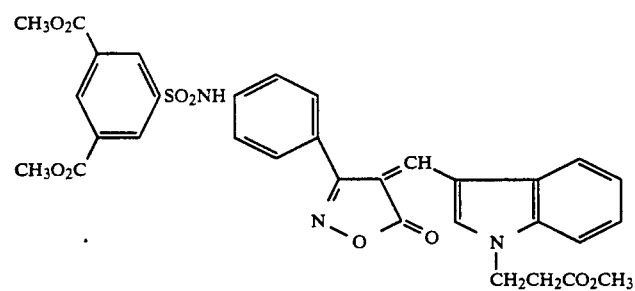
D-80
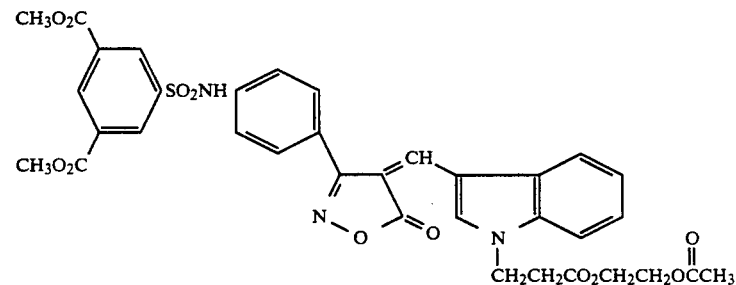
D-81

D-82
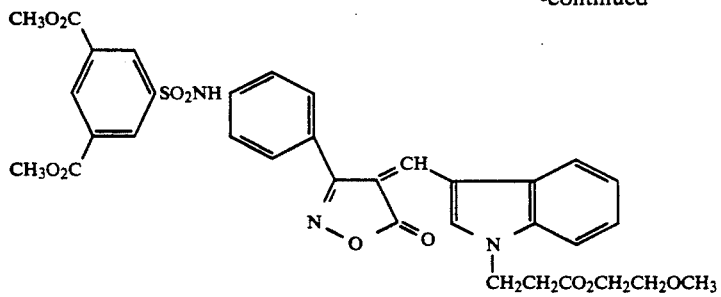
D-83
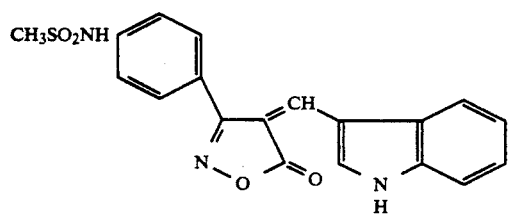
D-84
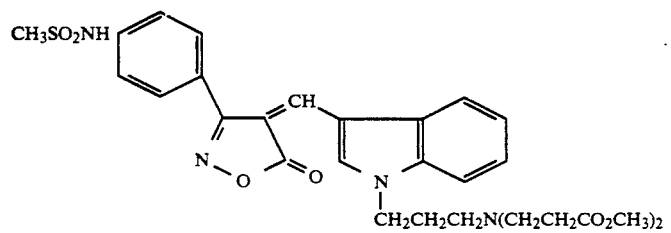
D-85
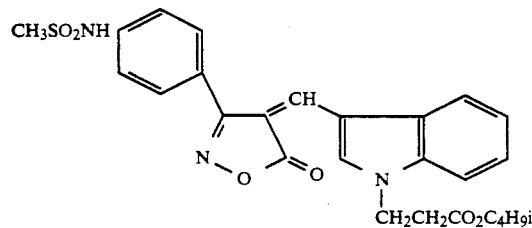
D-86
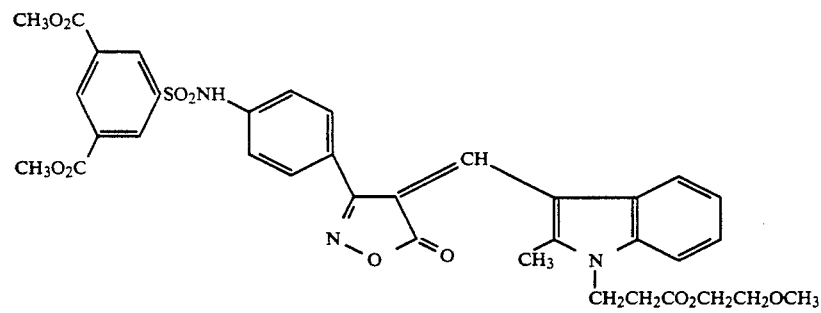
D-87
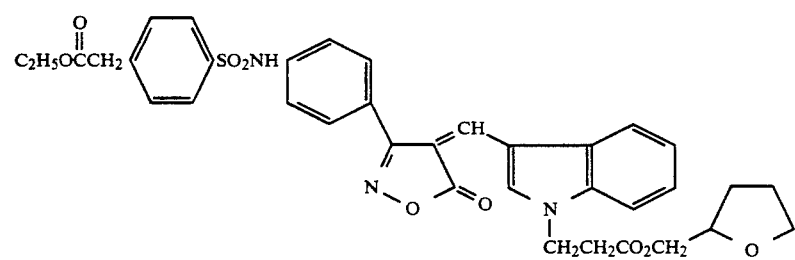
The compounds represented by formula (1) can be synthesized by mixing isoxazolone represented by the following formula (4) and aldehyde represented by the following formula (5) in an organic solvent (for example, methanol, ethanol, acetonitrile, DMF, pyridine, acetic acid and acetic anhydride) under the conditions of room temperature or refluxing, wherein there may be added a catalyst (for example, piperidine, glycine, β-aranine, p-toluenesulfonic acid, and ammonium acetate).

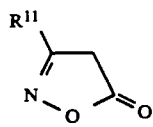

wherein R¹¹ represents the same groups as those defined for R¹¹ in formula (1).

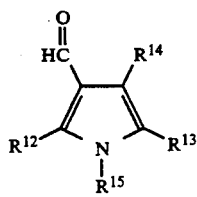

wherein R¹², R¹³, R¹⁴ and R¹⁵ each represents the same groups as those defined for R¹², R¹³, R¹⁴ and R¹⁵ in formula (1).

The compounds represented by formula (4) or (5) can be synthesized in the manner as shown in the following synthesis examples.

The synthesis examples are shown below:

Synthesis Example of Compound D-2

Potassium acetate (8.2 g) was added to a mixture of ethyl 4-methanesulfonamidobenzoylacetate (23.0 g), hydroxylamine hydrochloride (5.8 g) and methanol (35 ml), and the mixture was heated for refluxing for 30 minutes. The reaction mixture was poured into water (210 ml) to filter off the deposited crystals and dry them, whereby 3-(4-methanesulfonamidophenyl)isoxazoline-5-one (11.3 g) was obtained.

A mixture of 4-ethoxycarbonylaniline (82.6 g), acetonylacetone (68.5 g) and concentrated sulfuric acid (one drop) were heated at 150° C. for one hour. The reaction mixture was diluted with ethyl acetate and washed with water, followed by drying and concentrating, whereby 1-(4-ethoxycarbonylphenyl)-2,5-dimethylpyrrole was obtained.

A DMF (100 ml) solution of above pyrrole was added dropwise to a Vilsmeier reagent solution prepared from DMF (400 ml) and phosphorus oxychloride (115.0 g) while cooling with ice. After stirring at room temperature for 30 minutes, the reaction solution was added to a solution of potassium carbonate (259.1 g) and water (1 liter), and the mixture was extracted with ethyl acetate. The extracted solution was washed with a sodium chloride aqueous solution, then dried and concentrated. A crude product was recrystallized with ethanol for refining to thereby obtain 1-(4-ethoxycarbonylphenyl)-2,5-dimethyl-3-formylpyrrole (103.2 g).

A mixture of 3-(4-methanesulfonamidophenyl)isoxazoline-5-one (2.5 g), the above obtained formylpyrrole derivative (2.7 g) ethanol (30 ml) and piperidine (one drop) was heated for 2 hours while stirring. After cooling the reaction solution, the deposited crystals were filtered off to obtain Compound D-2 (4.4 g). λmax: 403 nm (AcOEt).

Synthesis Example of Compound D-78

Ethanol (3.6 g) and tetrahydrofuran (10 ml) were dropwise added to a solution of 2-chlorosulfonylbutyl chloride (14.4 g) and tetrahydrofuran (21 ml) while cooling with ice. After stirring at room temperature for 1 hour, ethyl p-aminobenzoylacetate (13.3 g), N,N-dimethylacetamide (33 ml) and pyridine (12.2 g) were added thereto, and the mixture was heated for refluxing for 30 minutes. 0.5 N hydrochloric acid (30 ml) was added to the reaction solution, and the mixture was extracted with ethyl acetate (120 ml). The extracted solution was washed with a sodium chloride aqueous solution (120 ml), then dried over magnesium sulfate, and concentrated. An oily product, ethyl p-(1-ethoxycarbonylpropanesulfonamido)benzoylacetate was quantitatively obtained.

Hydroxylamine hydrochloride (5.5 g), potassium acetate (7.6 g) and ethanol (35 ml) were added to the above oily product, and the mixture was heated for refluxing for 1 hours. 0.5 N hydrochloric acid was added to the reaction solution, the mixture was extracted with ethyl acetate. The extracted solution was washed with a sodium chloride aqueous solution, then dried over magnesium sulfate, and concentrated. An oily product, 3-{4-(1-ethoxycarbonylpropanesulfonamido)-phenyl}isooxazoline-5-one was quantitatively obtained.

3-Formyl-1-(2-ethoxycarbonylethyl)indole (13.7 g) and ethanol (140 ml) were added to the above oily product, and the mixture was heated for refluxing for 1 hour. After adding ethanol (70 ml) thereto, the mixture was cooled to room temperature, and the deposited crystals were collected by filtration. The collected crystals were recrystallized with a mixed solvent of ethanol and acetonitrile to thereby obtain Compound D-78 (22.4 g). Melting point: 117° to 119° C.

3-Formyl-1-(2-ethoxycarbonylethyl)indole was synthesized in the following manner.

A mixture of 3-formylindole (29.1 g), ethyl acrylate (22.2 g), N,N,N',N'-tetramethylguanidine (0.1 ml) and dioxane (67 ml) was heated for refluxing for 40 minutes. Water (200 ml) was added to the reaction mixture, and the mixture was stirred at room temperature. Deposited crystals was collected by filtration, and dried to thereby obtain 3-formyl-1-(2-ethoxycarbonylethyl)indole (46.2 g).

When the compound of formula (1), (2) or (3) is used as a filter dye or an anti-halation dye, an arbitrary amount can be used so that a prescribed effect is obtained. It is preferably used so that an optical density falls within the range of 0.05 to 3.5. The compound may be added in any step as long as it is before coating.

The compound of formula (1), (2) or (3) according to the present invention can be used in an emulsion layer or other hydrophilic colloid layer(s).

An oil and/or polymer latex composition of the dye used in the present invention can be dispersed by the following methods:

(1) A method in which a solution prepared by dissolving the compound in an oil, that is, a high boiling solvent which is substantially insoluble in water and has a boiling point of about 160° C. or higher, is added to a hydrophilic colloid solution for dispersing. There can be used as this high boiling solvent, for example, phthalic acid alkyl esters (for example, dibutyl phthalate and dioctyl phthalate), phosphoric acid esters (for example, diphenyl phosphate, triphenyl phosphate, tricresyl phosphate and dioctylbutyl phosphate), citric acid esters (for example, tributyl acetylcitrate), benzoic acid esters (for example, octyl benzoate), alkylamide (for example, diethyl laurylamide), fatty acid esters (for example, dibutoxyethyl succinate and diethyl azelate), and trimesic acid esters (for example, tributyl trimesate), as disclosed in U.S. Pat. No. 2,322,027.

Further, there can also be used the organic solvents having a boiling point of about 30° to about 150° C., for example, a lower alkyl acetate such as ethyl acetate and butyl acetate, ethyl propionate, secondary butyl alcohol, methyl isobutyl ketone, $\beta$-ethoxyethyl acetate, methyl cellosolve acetate, and a solvent which is easy to dissolve in water, for example, alcohols such as methanol and ethanol.

The ratio of a dye to a high boiling solvent used is preferably 10 to 1/10 by weight.

(2) A method in which a dye used in the present invention and the other additives are incorporated into a photographic emulsion layer and the other hydrophilic colloid layers as the polymer latex composition.

There can be used as the above polymer latex, for example, a polyurethane polymer, and a polymer prepared by polymerizing a vinyl monomer [examples of appropriate vinyl monomer include acrylic acid esters (methyl acrylate, ethyl acrylate, butyl acrylate, hexyl acrylate, octyl acrylate, dodecyl acrylate, and glycidyl acrylate), $\alpha$-substituted acrylic acid esters (methyl methacrylate, butyl methacrylate, octyl methacrylate, and glycidyl methacrylate), acrylamide (butyl acrylamide and hexyl acrylamide), $\alpha$-substituted acrylamide (butyl methacrylamide and dibutyl methacrylamide), vinyl esters (vinyl acetate and vinyl butyrate), halogenated vinyls (vinyl chloride), halogenated vinylidenes (vinylidene chloride), vinyl ethers (vinyl methyl ether and vinyl octyl ether), styrene, $\alpha$-substituted styrene ($\alpha$-methylstyrene), nucleus-substituted styrene (hydroxystyrene, chlorostyrene and methylstyrene), ethylene, propylene, butylene, butadiene, and acrylonitrile. These may be used singly or in combination of two or more kinds, or other vinyl monomers may be mixed therewith as a minor component. There can be given as the other vinyl monomers, itaconic acid, acrylic acid, methacrylic acid, hydroxyalkyl acrylate, hydroxyalkyl methacrylate, sulfoalkyl acrylate, sulfoalkyl methacrylate, and styrenesulfonic acid].

These polymer latexes can be prepared according to the methods described in JP-B-51-39853, JP-A-51-59943, JP-A-53-137131, JP-A-54-32552, JP-A-54-107941, JP-A-55-133465, JP-A-56-19043, JP-A-56-19047, JP-A-56-126830, and JP-A-58-149038.

The ratio of a dye to a polymer latex used is 10 to 1/10 by weight.

(3) A method in which the high boiling solvent in above (1) is replaced with or used in combination with a hydrophilic polymer. This method is described, for example, in U.S. Pat. No. 3,619,195 and German Patent 1,957,467.

(4) A method in which the compound is dissolved with a surface active agent. Oligomer or polymer is applied as a useful surface active agent.

The details of this polymer are described in JP-A-60-158437, pp. 19 to 27.

Hydrosol of a hydrophilic polymer described in JP-B-51-39835 may be added to the hydrophilic colloid dispersion obtained above.

Gelatin is representative as a hydrophilic colloid, and in addition thereto, there can be used any hydrophilic colloid which is known as usable in the photographic art.

Preferred examples of silver halide emulsion used in the present invention include silver bromide, silver iodobromide, silver iodochlorobromide, silver chlorobromide and silver chloride.

The light-sensitive material of the present invention may be provided on a support with at least one of the silver halide emulsion layers comprising a blue-sensitive layer, a green-sensitive layer and a red-sensitive layer and there are specifically no limits to the number and order of the silver halide emulsion layers and light-insensitive layers.

One typical example is the silver halide photographic light-sensitive material having on a support at least one light-sensitive layer comprising plural of the silver halide emulsion layers having substantially the same spectral sensitivity but different light sensitivities, wherein the light-sensitive layer comprises a unit light-sensitive layer having the spectral sensitivity to any of blue light, green light and red light. In a multilayer silver halide color photographic light-sensitive material, the unit light-sensitive layers are usually provided in the order of a red-sensitive layer, a green-sensitive layer and a blue-sensitive layer from the support side. According to purposes, however, the above order may be reversed, or there can be taken an arrangement order in which a layer having a different light sensitivity is interposed between the layers having the same spectral sensitivity.

Various light-insensitive layers such as an intermediate layer may be provided between the above silver halide light-sensitive layers and on the uppermost or lowest layer.

The above intermediate layer may contain the couplers and DIR compounds described in JP-A-61-43748, JP-A-59-113438, JP-A-59-113440, JP-A-61-20037, and JP-A-61-20038 and further contain a color stain preventing agent as usually used.

The plural silver halide emulsion layers constituting the respective unit light-sensitive layers can preferably have a two layer structure consisting of a high-sensitive emulsion layer and a low-sensitive emulsion layer, as described in German Patent 1,121,470 or British Patent 923,045. Usually, lower sensitive layers are preferably provided more closely to the support in order. Also, a light-insensitive layer may be provided between the respective silver halide emulsion layers.

Also, a low sensitive layer may be provided farther from the support and a high sensitive layer may be provided more closely to the support, as described in JP-A-57-112751, JP-A-62-200350, JP-A-62-206541, and JP-A-62-206543.

A concrete example is to provide the layers from the side farthest from the support in the order of a low blue-sensitive layer (BL)/a high blue-sensitive layer (BH)/a high green-sensitive layer (GH)/a low green-sensitive layer (GL)/a high red-sensitive layer (RH)/a low red-sensitive layer (RL), the order of BH/BL/GL/GH/RH/RL, or the order of BH/BL/GH/GL/RL/RH.

Further, the layers can be provided from the side farthest from the support in the order of a blue-sensitive layer/GH/RH/GL/RL, as described in JP-B-55-34932. The layers can also be provided from the side farthest from the support in the order of a blue-sensitive layer/GL/RL/GH/RH, as described in JP-A-56-25738 and JP-A-62-63936.

Further, there can be given an arrangement of three layers each having the same spectral sensitivities but different light sensitivities which are lowered in order toward a support, in which a highest light-sensitive silver halide emulsion layer is provided on the uppermost side, a middle light-sensitive silver halide emulsion layer is provided on an intermediate side, and the lowest light-sensitive silver halide emulsion layer is provided on a lower side, as described in JP-B-49-15495. Also in the case where the layers consist of such three layers as having the different light sensitivities, the layers having the same spectral sensitivity may be provided from the side farthest from the support in the order of a middle light-sensitive emulsion layer/a high light-sensitive emulsion layer/a low light-sensitive layer, as described in JP-A-59-202464.

In addition to the above, the layers may be provided in the order of a high sensitive layer/a low sensitive layer/a middle sensitive layer, or the order of a low sensitive layer/a middle sensitive layer/a high sensitive layer. A layer arrangement may be changed as described above also in the case of four layers or more.

In order to improve a color reproduction, a donor layer (CL) having an interlayer effect, which is different in a spectral sensitivity distribution from the primary light-sensitive layers such as BL, GL and RL, described in the specifications of U.S. Pat. Nos. 4,663,271, 4,705,744 and 4,707,436, and JP-A-62-160448 and JP-A-63-89850, is preferably provided adjacently or closely to the primary light-sensitive layers.

As described above, various layer structures and arrangements can be selected according to the purposes of the respective light-sensitive materials.

Preferred silver halide contained in the light-sensitive material used in the present invention is silver iodobromide, silver iodochloride or silver iodochlorobromide each containing about 30 mole % of silver iodide. Particularly preferred is silver iodobromide or silver iodochlorobromide each containing up to about 2 to about 10 mole % of silver iodide.

The silver halide grains contained in a photographic emulsion may be of a regular crystal shape such as cube, octahedron and tetradecahedron, an irregular crystal shape such as sphere and plate, a defective crystal such as a twinned crystal, or a composite form thereof.

A silver halide may comprise fine grains having a size of about 0.2 μm or less, or large grains having a projected area-circle corresponding diameter of up to about 10 μm. The silver halide emulsion may be either polydisperse or monodisperse.

The silver halide photographic emulsion used in the present invention can be prepared by the methods described in, for example, *Research Disclosure* (RD) No. 17643 (December 1978), pp. 22 to 23, "I. Emulsion Preparation and Types", No. 18716 (November 1979), pp. 648, and No. 307105 (November 1989), pp. 863 to 865, "Chimie et Physique Photographique" written by P. Glafkides, published by Paul Montel Co. (1967), "Photographic Emulsion Chemistry" written by G. F. Duffin, published by Focal Press Co. (1966), and "Making and Coating Photographic Emulsion" written by V. L. Zelikman et al, published by Focal Press Co. (1964).

Also preferred are the monodisperse emulsions described in U.S. Pat. Nos. 3,574,628 and 3,655,394, and British Patent 1,413,748.

The tabular grains having an aspect ratio of 3 or more can also be used in the present invention. The tabular grains can readily be prepared by the methods described in "Photographic Science and Engineering" written by Gutoff, vol. 14, pp. 248 to 257 (1970), U.S. Pat. Nos. 4,434,226, 4,414,310, 4,433,048, and 4,439,520, and British Patent 2,112,157.

The crystal structure may be uniform or of a structure in which a halogen composition is different in an inside and a surface, or of a stratum structure. Further, silver halides of different compositions may be conjugated with an epitaxial conjunction. Also, it may be of a structure in which silver halide is conjugated with the compounds other than silver halide, for example, silver rhodanide and lead oxide. Further, the mixture of the grains having the different crystal forms may be used.

The above emulsion may be of any of a surface latent image type in which a latent image is formed primarily on a surface, an inner latent image type in which a latent image is formed primarily in an inside of a grain, or a type in which latent images are formed either on a surface or in an inside of a grain. The emulsion has to be of a negative type. Of the emulsions of the inner latent image type, the emulsion may be a core/shell inner latent image type emulsion described in JP-A-63-264740. The preparation method of this core/shell inner latent image type emulsion is described in JP-A-59-133542. The thickness of a shell of this emulsion is changeable by development processing. It is preferably 3 to 40 nm, particularly preferably 5 to 20 nm.

Usually, the silver halide emulsions are subjected to physical ripening, chemical ripening and spectral sensitization before using. The additives used in such steps are described in *Research Disclosure*, No. 17643, No. 18716 and No. 307105, and the corresponding portions are summarized in the table shown later.

In the light-sensitive material of the present invention, there can be mixed and used in the same layer, the emulsions of two or more kinds each having at least one different characteristic of a grain size, a grain size distribution, a halogen composition, a grain form and a sensitivity of a light-sensitive silver halide emulsion.

There can be preferably used the silver halide grains the surfaces of which are fogged, described in U.S. Pat. No. 4,082,553, the silver halide grains the grain insides of which are fogged, described in U.S. Pat. No. 4,626,498 and JP-A-59-214852, and colloidal silver for a light-sensitive silver halide emulsion layer and/or a substantially light-insensitive hydrophilic colloid layer. The silver halide grains in which the insides or surfaces thereof are fogged are defined by the silver halide grains which can be uniformly (non-imagewise) developed regardless of an unexposed portion and an exposed portion of light-sensitive material. The methods for preparing the silver halide grains in which the insides or surfaces thereof are fogged are described in U.S. Pat. No. 4,626,498 and JP-A-59-214852.

The silver halide constituting an inner nucleus of a core/shell type silver halide grain in which the inside thereof is fogged may be either of the same composition as or a different composition from that of the shell. Anyone of silver chloride, silver chlorobromide, silver iodobromide and silver iodochlorobromide can be used as the silver halide grains in which the insides or surfaces thereof are fogged. The grain size of these fogged silver halide grains is not specifically limited. The average grain size thereof is preferably 0.01 to 0.75 μm, particularly preferably 0.05 to 0.6 μm. Also, the grain form thereof is not specifically limited. It may be a regular grain or a polydisperse emulsion but is preferably monodisperse (at least 95% by weight or by number of the silver halide grains have the grain sizes falling within an average grain size ±40%).

In the present invention, light-insensitive silver halide fine grains are preferably used. The light-insensitive silver halide fine grains are the silver halide grains which are not sensitized in image-wise exposing for forming a dye image and not substantially subjected to a development in a development processing and are preferably not fogged in advance.

The silver halide fine grains have a silver bromide content of 0 to 100 mole% and may contain silver chloride and/or silver iodide according to necessity. They contain preferably silver iodide of 0.5 to 10 mole %.

The silver halide fine grains have an average grain size (an average value of a diameter of a circle corresponding to a projected area of a grain) of preferably 0.01 to 0.5 μm, more preferably 0.02 to 0.2 μm.

The light-insensitive silver halide fine grains can be prepared by the same method as that for preparing conventional light-sensitive silver halide. In this case, the silver halide fine grains are needed to have the surface thereof neither optically sensitized nor spectrally sensitized. However, the publicly known stabilizers such as triazole type, azaindene type, benzothiazolium type and mercapto type compounds and a zinc compound are preferably added in advance before adding the silver halide fine grains to a coating solution.

Colloidal silver is preferably added to a layer containing the silver halide fine grains.

An amount of silver coated on the light-sensitive material of the present invention is preferably 6.0 g/m² or less, most preferably 4.5 g/m² or less. The publicly known photographic additives which can be used in the present invention also are described in the above three *Research Disclosures*, and the corresponding portions described therein are shown in the following table.

| Kind of additives | RD 17643 | RD 18716 | RD 307105 |
|---|---|---|---|
| 1. Chemical sensitizer | pp. 23 | pp. 648, right colm. | pp. 866 |
| 2. Sensitivity improver | — | pp. 648, right colm. | — |
| 3. Spectral sensitizer & Supersensitizer | pp. 23 to 24 | pp. 648, right colm. to pp. 649, right colm. | pp. 866 to 868 |
| 4. Brightening agent | pp. 24 | pp. 647. right colm. | pp. 868 |
| 5. Anti-foggant & Stabilizer | pp. 24 to 25 | pp. 649, right colm. | pp. 868 to 870 |
| 6. Light absorber, Filter dye, & UV absorber | pp. 25 to 26 | pp. 649, right colm. to pp. 650, left colm. | pp. 873 |
| 7. Anti-stain agent | pp. 25 right. colm | pp. 650, left colm. to right colm. | pp. 872 |
| 8. Dye image stabilizer | pp. 25 | pp. 650, left colm. | pp. 872 |
| 9. Hardener | pp. 26 | pp. 651, left colm. | pp. 874 to 875 |
| 10. Binder | pp. 26 | pp. 651, left colm. | pp. 873 to 874 |
| 11. Plasticizer & Lubricant | pp. 27 | pp. 650, right colm. | pp. 876 |
| 12. Coating aid & Surfactant | pp. 26 to 27 | pp. 650, right colm. | pp. 875 to 876 |
| 13. Anti-static agent | pp. 27 | pp. 650, right colm. | pp. 876 to 877 |
| 14. Matting agent | — | — | pp. 878 to 879 |

For the purpose of preventing the deterioration of the photographic properties attributable to a formaldehyde gas, preferably added to a light-sensitive material are the compounds capable of reacting with formaldehyde to fix it, which are described in U.S. Pat. Nos. 4,411,987 and 4,435,503.

Preferably incorporated into the light-sensitive material of the present invention are the mercapto compounds described in U.S. Pat. Nos. 4,740,454 and 4,788,132, and JP-A-62-18539 and JP-A-1-283551.

Preferably incorporated into the light-sensitive material of the present invention are a foggant, a development accelerator, a silver halide solvent and a compound capable of releasing a precursor thereof, regardless of an amount of a developed silver which is formed by a development processing.

In the present invention, various color couplers can be used. The concrete examples thereof are described in the patents abstracted in above *Research Disclosure* No. 17643, VII-C to G and No. 307105, VII-C to G.

Preferred as a yellow coupler are the compounds described, for example, in U.S. Pat. Nos. 3,933,501, 4,022,620, 4,326,024, 4,401,752, and 4,248,961, JP-B-58-10739, British Patents 1,425,020 and 1,476,760, U.S. Pat. Nos. 3,973,968, 4,314,023 and 4,511,649, and EP-A-249473.

5-pyrazolone type and pyrazoloazole type compounds are preferred as a magenta coupler. Particularly preferred are the compounds described in U.S. Pat. Nos. 4,310,619 and 4,351,897, European Patent 73,636, U.S. Pat. Nos. 3,061,432 and 3,725,067, *Research Disclosure* No. 24220 (June 1984), JP-A-60-33552, *Research Disclosure* No. 24230 (June 1984), JP-A-60-43659, JP-A-61-72238, JP-A-60-35730, JP-A-55-118034, and JP-A-60-185951, U.S. Pat. Nos. 4,500,630, 4,540,654, and 4,556,630, and International Publication WO 88/04795.

There can be given as a cyan coupler, phenol type and naphthol type couplers. Preferred are the compounds described in U.S. Pat. Nos. 4,052,212, 4,146,396, 4,228,233, 4,296,200, 2,369,929, 2,801,171, 2,772,162, 2,895,826, 3,772,002, 3,758,308, 4,334,011, and 4,327,173; German Patent Publication 3,329,729, EP-A-121365 and EP-A-249453; U.S. Pat. Nos. 3,446,622, 4,333,999, 4,775,616, 4,451,559, 4,427,767, 4,690,889, 4,254,212, and 4,296,199; and JP-A-61-42658. Further, there can be used the pyrazoloazole type couplers described in JP-A-64-553, JP-A-64-554, JP-A-64-555, and JP-A-64-556, and the imidazole type couplers described in U.S. Pat. No. 4,818,672.

The typical examples of a polymerized dye-forming coupler are described in U.S. Pat. Nos. 3,451,820, 4,080,211, 4,367,282, 4,409,320, and 4,576,910, British Patent 2,102,137, and EP-A-341188.

Preferred as a coupler capable of forming a dye having an appropriate dispersing property are the compounds described in U.S. Pat. No. 4,366,237, British Patent 2,125,570, European Patent 96,570, and German Patent (OLS) 3,234,533.

Preferred as a colored coupler used for correcting an unnecessary absorption of a developed dye are the compounds described in *Research Disclosure* No. 17643, VII-G and No. 307105, VII-G, U.S. Patent 4,163,670, JP-B-57-39413, U.S. Pat. Nos. 4,004,929 and 4,138,258, and British Patent 1,146,368. Also, preferably used are the couplers which correct an unnecessary absorption of a developed dye with a fluorescent dye released in coupling, described in U.S. Pat. No. 4,774,181, and the couplers having as a releasing group a dye precursor group capable of reacting with a developing agent to form a dye, described in U.S. Pat. No. 4,777,120.

In the present invention, there can also be preferably used the compounds releasing a photographically useful residue by coupling. Preferred as a DIR coupler releasing a development inhibitor are the compounds described in the patents abstracted in above RD No. 17643, VII-F and No. 307105, VII-F, JP-A-57-151944, JP-A-57-154234, JP-A-60-184248, JP-A-63-37346, and JP-A-63-37350, U.S. Pat. Nos. 4,248,962 and 4,782,012.

The bleaching accelerator-releasing couplers described in RD Nos. 11449 and 24241 and JP-A-61-201247 are effective for shortening the time in a processing step for bleaching and are particularly effective when they are added to a light-sensitive material in which the above tabular silver halide grains are used.

Preferred as a coupler releasing imagewise a nucleus-forming agent or a development accelerator in developing are the compounds described in British Patents 2,097,140 and 2,131,188, and JP-A-59-157638 and JP-A-59-170840. Also preferred are the compounds releasing a foggant, a development accelerator and a silver halide solvent upon an oxidation-reduction reaction with an oxidation product of a developing agent, which are described in JP-A-60-107029, JP-A-60-252340, JP-A-1-44940 and JP-A-1-45687.

In addition to the above, there can be given, as the compounds capable of being used for the light-sensitive material of the present invention, the competitive couplers described in U.S. Pat. No. 4,130,427; the polyequivalent couplers described in U.S. Pat. Nos. 4,283,472, 4,338,393 and 4,310,618; the DIR redox compound-releasing couplers, DIR coupler-releasing couplers, DIR coupler-releasing redox compounds or DIR redox-releasing redox compounds described in JP-A-60-185950 and JP-A-62-24252; the couplers releasing a dye whose color is recovered after splitting off, described in EP-A-173302 and EP-A-313308; the ligand-releasing couplers, described in U.S. Pat. No. 4,555,477; the couplers releasing a leuco dye, described in JP-A-63-75747; and the couplers releasing a fluorescent dye, described in U.S. Pat. No. 4,774,181.

The couplers used in the present invention can be incorporated into a light-sensitive material by various conventional dispersing methods.

Examples of a high boiling-solvent used in an oil-in-water dispersion method are described in U.S. Pat. No. 2,322,027. Concrete examples of the high boiling organic solvent which has a boiling point of 175° C. or higher at a normal pressure and is used in the oil-in-water dispersion method are phthalic acid esters (dibutyl phthalate, dicyclohexyl phthalate, di-2-ethylhexyl phthalate, decyl phthalate, bis(2,4-di-t-amylphenyl) phthalate, bis(2,4-di-t-amylphenyl) isophthalate, and bis(1,1-diethylpropyl) phthalate), phosphoric acid or phosphonic acid esters (triphenyl phosphate, tricresyl phosphate, 2-ethylhexyldiphenyl phosphate, tricyclohexyl phosphate, tri-2-ethylhexyl phosphate, tridecyl phosphate, tributoxyethyl phosphate, trichloropropyl phosphate, and di-2-ethylhexylphenyl phosphate), benzoic acid esters (2-ethylhexyl benzoate, dodecyl benzoate, and 2-ethylhexyl p-hydroxybenzoate), amides (N,N-diethyldodecanamide, N,N-diethyllaurylamide, and N-tetradecylpyrrolidone), alcohols and phenols (isostearyl alcohol and 2,4-di-tert-amylphenol), aliphatic carboxylic acid esters (bis(2-ethylhexyl) sebacate, dioctyl azelate, glycerol tributylate, isostearyl lactate, and trioctyl citrate), aniline derivatives· (N,N-dibutyl-2-butoxy-5-tert-octylaniline), and hydrocarbons (paraffin, dodecylbenzene, and diisopropylnaphthalene).

Further, there can be used as an auxiliary solvent, organic solvents having a boiling point of about 30° C. or higher, preferably 50° C. or higher and about 160° C. or lower. The typical examples thereof are ethyl acetate, butyl acetate, ethyl propionate, methyl ethyl ketone, cyclohexanone, 2-ethoxyethyl acetate, and dimethylformamide.

The concrete examples of the steps and effects of a latex dispersing method and the latexes for impregnation are described in U.S. Pat. No. 4,199,363, and German Patent Applications (OLS) 2,541,274 and 2,541,230.

Preferably incorporated into the color light-sensitive material of the present invention, various preservatives and anti-mold agents such as phenethyl alcohol, and 1,2-benzisothiazoline-3-one, n-butyl p-hydroxybenzoate, phenol, 4-chloro-3,5-dimethylphenol, 2-phenoxyethanol, and 2-(4-thiazolyl) benzimidazole each described in JP-A-63-257747, JP-A-62-272248 and JP-A-1-80941.

The present invention can be applied to various color light-sensitive materials. There can be given as the representative examples, a color negative film for a general use or a movie, a color reversal film for a slide or a television, a color paper, a color positive film, and a color reversal paper.

An appropriate support which can be used in the present invention is described, for example, in the above RD No. 17643, pp. 28, No. 18716, pp. 647 right column to pp. 648 left column, and No. 307105, pp. 879.

In the light-sensitive material of the present invention, the total of the thicknesses of all the hydrophilic colloid layers provided on a support side having an emulsion layer is preferably 28 μm or less, more preferably 23 μm or less, further more preferably 18 μm or less, and particularly preferably 16 μm or less.

A layer swelling speed $T_{\frac{1}{2}}$ is preferably 30 seconds or less, more preferably 20 seconds or less, wherein the layer thickness means a layer thickness measured after standing at 25° C. and a relative humidity of 55% for two days; $T_{\frac{1}{2}}$ can be measured according to the methods publicly known in the art; for example, it can be measured with a swellometer of a type described in Photographic Science and Engineering written by A. Green et al, vol. 19, No. 2, pp. 124 to 129; and $T_{\frac{1}{2}}$ is defined by a time necessary to reach a half of a saturated layer thickness, in which the saturated layer thickness corresponds to 90% of the maximum swelling layer thickness attained when the layer is processed in a color developing solution at 30° C. for 3 minutes and 15 seconds.

The layer swelling speed $T_{\frac{1}{2}}$ can be adjusted by adding a hardener to gelatin which acts as a binder or by changing the aging conditions after coating. A swelling ratio is preferably 150 to 400%, wherein the swelling ratio can be calculated from the maximum swollen layer thickness attained at the above mentioned conditions according to the following equation:

(maximum swollen layer thickness—layer thickness)÷layer thickness.

A hydrophilic colloid layer (called a back layer) having the total of the dry layer thicknesses of 2 to 20 μm is preferably provided on a support side opposite to an emulsion layer in the light-sensitive material of the present invention. Preferably incorporated into this back layer are the above light absorber, filter dye, UV absorber, anti-static agent, hardener, binder, plasticizer, lubricant, coating aid, and surface active agent. The swelling ratio of this back layer is preferably 150 to 500%.

The color light-sensitive material according to the present invention can be subjected to a development processing according to the conventional methods described in above RD No. 17643, pp. 28 to 29, No. 18716, pp. 651 a left column to a right column, and No. 307105, pp. 880 to 881.

The color developing solution used for the development processing of the light-sensitive material of the present invention is preferably an alkaline aqueous solution containing an aromatic primary amine type color developing agent as a primary component. An aminophenol compound is also useful as the color developing agent but a p-phenylenediamine type compound is preferably used. There can be given as the representative examples thereof, 3-methyl-4-amino-N,N-diethylaniline, 3-methyl-4-amino-N-ethyl-N-$\beta$-hydroxyethylaniline, 3-methyl-4-amino-N-ethyl-$\beta$-methanesulfonamidoethylaniline, 3-methyl-4-amino-N-ethyl-$\beta$-methoxyethylaniline, and sulfates, chlorinates and p-toluenesulfonates thereof. Of them, particularly preferred is 3-methyl-4-amino-N-ethyl-N-$\beta$-hydroxyethylaniline sulfate. These compounds can also be used in combination of two or more kinds.

In general, the color developing solution contains a pH buffer agent such as carbonates, borates and phosphates of alkali metals, and a development inhibitor or anti-foggant such as chlorides, bromides, iodides, benzimidazoles, benzothiazoles, and mercapto compounds. Further, there may be added to a color developing solution according to necessity, hydroxylamine, diethylhydroxylamine, sulfite, hydrazines such as N,N-bis-carboxymethylhydrazine, various preservatives such as phenyl semicarbazides, triethanolamine and catecholsulfonic acids, an organic solvent such as ethylene glycol and diethylene glycol, a development accelerator such as benzyl alcohol, polyethylene glycol, a quaternary ammonium salt and amines, a dye-forming coupler, a competitive coupler, an auxiliary developing agent such as 1-phenyl-3-pyrazolidone, a tackifier, and various chelating agents represented by amino polycarboxylic acid, amino polyphosphonic acid, alkylphosphonic acid, and phosphonocarboxylic acid, for example, ethylenediaminetetracetic acid, nitrilotriactic acid, diethylenetriaminepentacetic acid, cyclohexanediaminetetracetic acid, hydroxyethyliminodiacetic acid, 1-hydroxyethylidene-1,1-diphosphonic acid, nitrilo-N,N,N-trimethylenephosphonic acid, ethylenediamine-N,N,N,N-tetramethylenephosphonic acid, ethylenediaminedi(o-hydroxyphenyl acetic acid), and the salts thereof.

In carrying out a reversal processing, a color development is usually carried out after a black-and-white development. There can be used singly or in combination as this black-and-white developing solution, the publicly known black-and-white developing agents such as dihydroxybenzenes including hydroquinone, 3-pyrazolidones including 1-phenyl-3-pyrazolidone, and aminophenols including N-methyl-p-aminophenol.

In general, the pH of these color developing solution and black-and-white developing solution is 9 to 12.

A replenishing amount of the developing solutions depends on a color photographic light-sensitive material to be processed. In general, it is 3 liters or less per m² of a light-sensitive material, and it also is possible to reduce it to 500 ml per m² of a light-sensitive material by keeping a bromide ion concentration contained in a replenishing solution reduced. In order to reduce a replenishing amount, an area of a processing bath contacted to air is preferably reduced to thereby prevent an evaporation and air oxidation of a processing solution.

The area of a photographic processing solution contacted to air in a processing bath can be expressed by an aperture ratio defined as follows:

Aperture ratio = [area of a solution contacted to air (cm²)] ÷ [volume of the processing solution (cm³)]

The above aperture ratio is preferably 0.1 or less, more preferably 0.001 to 0.05. There can be given as the method for reducing the aperture ratio, the method described in JP-A-1-82033, in which a movable lid is used, and a slit development processing method described in JP-A-63-216050, as well as the method in which a shielding means such as a floating lid is put on the surface of a photographic processing solution in a processing bath.

The reduction of the aperture ratio is preferably applied not only to the both steps of a color development and a black-and-white development but also to the various steps following them, for example, all the steps of bleaching, bleach/fixing, fixing, washing and stabilizing. Further, a means for controlling the accumulation of a bromide ion contained in a developing solution can be used to lower a replenishing amount.

Time for a color development processing is usually set at the range of 2 to 5 minutes. A temperature and pH can be set high and a color developing agent can be used in a high concentration to further shorten a processing time.

Not only a color developing solution but also any photographic developing methods may be applied to the light-sensitive material of the present invention. There are available as a developing agent used for a developing solution, a dihydroxybenzene type developing agent, a 1-phenyl-3-pyrazolidone type developing agent, and a p-aminophenol type developing agent, and they can be used singly or in combination (for example, 1-phenyl-3-pyrazolidones and dihydroxybenzenes, or p-aminophenols and dihydroxybenzenes).

Further, the light-sensitive material of the present invention may be processed in a so called infectious developing solution in which a sulfurous acid ion buffer such as carbonyl bisulfite and hydroquinone are used.

In the above, there are available as the dihydroxybenzene type developing agent, for example, hydroquinone, chlorohydroquinone, bromohydroquinone, isopropylhydroquinone, toluhydroquinone, methylhydroquinone, 2,3-dichlorohydroquinone, and 2,5-dimethylhydroquinone. There are available as the 1-phenyl-3-pyrazolidone type developing agent, 1-phenyl-3-pyrazolidone, 4,4-dimethyl-1-phenyl-3-pyrazolidone, 4-hydroxymethyl-4-methyl-1-phenyl-3-pyrazolidone, and 4,4-dihydroxymethyl-1-phenyl-3-pyrazolidone. p-Aminophenol and N-methyl-p-aminophenol are used as the p-aminophenol type developing agent.

Added as a preservative to a developing solution, a compound providing a dissociated sulfite ion, for example, sodium sulfite, potassium sulfite, potassium metabisulfite, and sodium bisulfite. In case of an infectious developing solution, there may be used formaldehyde sodium bisulfite which scarcely provides a dissociated sulfite ion in a developing solution.

There can be used as an alkali agent, potassium hydroxide, sodium hydroxide, potassium carbonate, sodium carbonate, sodium acetate, potassium tertiary phosphate, diethanolamine, and triethanolamine. Usually, pH of a developing solution is set at 9 or more, preferably 9.7 or more.

A developing solution may contain an organic compound which is known as an anti-foggant or a development inhibitor. The examples thereof are azoles, for example, benzothiazolium salts, nitroindazoles, nitrobenzimidazoles, chlorobenzimidazoles, bromobenzimidazoles, mercaptothiazoles, mercaptobenzothiazoles, mercaptobenzimidazoles, mercaptothiadiazoles, aminotriazoles, benzotriazoles, nitrobenzotriazoles, and mercaptotetrazoles (in particular, 1-phenyl-5-mercaptotetrazole); mercaptopyrimidines; mercaptotriazines, for example, a thioketo compound such as oxazolinethione; azaindenes, for example, triazaindenes, tetrazaindenes (in particular, 4-hydroxy-substituted (1,3,3a,7)tetrazaindenes), and pentazaindenes; benzenethiosulfonic acid, benzenesulfinic acid, benzenesulfonic acid amide, and sodium 2-mercaptobenzimidazole-5-sulfonate.

The same polyarylene oxide as previously described may be incorporated as a development inhibitor into a developing solution which can be used in the present invention. For example, polyethylene oxide having a molecular weight of 1,000 to 10,000 can be incorporated in the range of 0.1 to 10 g/liter.

Preferably added as a water softener to a developing solution which can be used in the present invention are nitriloacetic acid, ethylenediaminetetraacetic acid, triethylenetetraminehexaacetic acid, and diethylenetriaminepentaacetic acid.

There can be used for a developing solution which can be used in the present invention, the compounds described in JP-A-56-24347 as an anti-silver stain agent, the compounds described in JP-A-62-212651 as an anti-uneven development agent, and the compounds described in Japanese Patent Application No. 60-109743 (corresponding to JP-A-61-267759)as a dissolution aid.

There can be used as a buffer agent for a developing solution which can be used in the present invention, boric acid descried in JP-A-62-186259, saccharides (for example, sucrose) described in JP-A-60-93433, oximes (for example, acetoxime), phenols (for example, 5-sulfosalicylic acid), and tertiary phosphoric acid salts (for example, a sodium salt and a potassium salt).

Various compounds may be used as a development accelerator used in the present invention. These compounds may be added either to a light-sensitive material or any of the processing solutions. There can be given as a preferred development accelerator, an amine type compound, an imidazole type compound, an imidazoline type compound, a phosphonium type compound, a sulfonium type compound, a hydrazine type compound, a thioether type compound, a thione type compound, some kind of a mercapto compound, a mesoionic type compound, and a thiocyanic acid salt.

In particular, these compounds are necessary for carrying out a rapid development processing in a short time. These development accelerators are added preferably to a color development solution. They also can be incorporated into a light-sensitive material according to a kind of a development accelerator or by a constitutional position of a light-sensitive layer on a support, which is to be subjected to a development acceleration. It is also possible to add them to both of the color development solution and light-sensitive material. Further, in some cases they can be incorporated into a pre-bath provided before a color developing bath.

An amino compound useful as an amino compound includes, for example, an inorganic amine and organic amine such as hydroxylamine. The organic amine can be aliphatic amine, aromatic amine, cyclic amine, aliphatic-aromatic mixed amine, or heterocyclic amine. Primary, secondary and tertiary amines and a quaternary ammonium compound are all useful.

A photographic emulsion layer is usually subjected to a bleaching processing after a color development processing. The bleaching processing may be carried out at the same time as a fixing processing (bleach-fixing processing) or may be independently carried out. Further, there may be applied a processing method in which a bleach-fixing processing is carried out after the bleaching processing in order to accelerate the processing. Further, it can be carried out according to the purposes to process in two successive bleach-fixing baths, to carry out a fixing processing before a bleach-fixing processing or to carry out a bleaching processing after a bleach-fixing processing. There are used as a bleaching agent, for example, the compounds of polyvalent metals such as iron (III), peracids, quinones, and nitro compounds. There can be used as the representative bleaching agents, an organic complex salt of iron (III), for example, aminopolycarboxylic acids such as ethylenediaminetetraacetic acid, diethylenetriaminepentaacetic acid, cyclohexanediaminetetraacetic acid, methyliminodiacetic acid, 1,3-diaminopropanetetraacetic acid, and glycol ether diaminetetraacetic acid, and the complex salts of citric acid, tartaric acid and malic acid. Among them, preferred from the viewpoint of a rapid processing and an environmental pollution are aminopolycarboxylic acid iron (III) complex salts including an ethylenediaminetetraacetic acid iron (III) complex salt and a 1,3-diaminopropanetetraacetic acid iron (III) complex salt. Further, the aminopolycarboxylic acid iron (III) complex salts are particularly useful either for a bleaching solution or a bleach-fixing solution. A bleaching solution or bleach-fixing solution in which these aminopolycarboxylic acid iron (III) complex salts are used usually has pH of 4.0 to 8, and a processing can be carried out at further lower pH for the purpose of accelerating the processing.

A bleaching accelerator can be used for a bleaching bath, a bleach-fixing bath and a pre-bath thereof according to necessity. Concrete examples of the useful bleaching accelerators are described in the following specifications: the compounds having a mercapto group or a disulfide group, described in U.S. Pat. No. 3,893,858, German Patents 1,290,812 and 2,059,988, JP-A-53-32736, JP-A-53-57831, JP-A-53-37418, JP-A-53-72623, JP-A-53-95630, JP-A-53-95631, JP-A-53-04232, JP-A-53-124424, JP-A-53-141623, and JP-A-53-128426, and Research Disclosure No. 17129 (July 1978); the thiazolidine derivatives described in JP-A-50-40129; the thiourea derivatives described in JP-B-45-8506, JP-A-52-20832 and JP-A-53-32735, and U.S. Pat. No. 3,706,561; iodides described in German Patent 1,127,715 and JP-A-58-16235; the polyoxyethylene compounds described in German Patents 966,410 and 2,748,430; the polyamine compounds described in JP-B-45-8836; the compounds described in JP-A-49-40943, JP-A-49-59644, JP-A-53-94927, JP-A-54-35727, JP-A-55-26506, and JP-A-58-163940; and bromide ions. Among them, the compounds having a mercapto group or a disulfide group are preferred from the viewpoint of a larger bleaching acceleration effect. Particularly preferred are the compounds described in U.S. Pat. No. 3,893,858, German Patent 1,290,812, and JP-A-53-95630. Further, the compounds described in U.S. Pat. No. 4,552,834 are also preferred. These bleaching accelerators may be incorporated into a light-sensitive material. These bleaching accelerators are particularly useful when a color light-sensitive material for photographing is bleached and fixed.

Besides the above compounds, organic acid is preferably incorporated into a bleaching solution and a bleach-fixing solution for the purpose of preventing a bleaching stain. Particularly preferred organic acid is a compound having an acid dissociation constant (pKa) of 2 to 5. To be concrete, acetic acid, propionic acid and hydroxyacetic acid are preferred.

There can be given, as a fixing agent used for a fixing solution and a bleach-fixing solution, thiosulfates, thiocyanates, thioether type compounds, thioureas, and a lot of bromides. Thiosulfates are generally used, and particularly ammonium thiosulfate can be most widely used. Further, preferably used in combination with thiosulfates are thiocyanates, thioether type compounds, and thioureas. Preferred as a preservative for a fixing solution and a bleach-fixing solution are sulfites, bisulfates, carbonyl bisulfurous acid adducts, or the sulfinic acid compounds described in EP-A-294769. Further, various aminopolycarboxylic acids and organic phosphonic acids are preferably added to the fixing solution and bleach-fixing solution for the purpose of stabilizing the solutions.

In the present invention, preferably incorporated into a fixing solution or a bleach-fixing solution for adjusting pH are the compounds having pKa of 6.0 to 9.0, preferably imidazoles such as imidazole, 1-methylimidazole, 1-ethylimidazole, 2-methylimidazole in an amount of 0.1 to 10 mole/liter.

The shorter the total time for a desilvering step the better as far as no inferior desilvering takes place. The time is preferably 1 to 3 minutes, more preferably 1 to 2 minutes. Also, a processing temperature is 25° to 50° C., preferably 35° to 45° C. In a preferred temperature range, a desilvering speed is increased and in addition, stain is effectively prevented from generating after processing.

In the desilvering step, stirring is preferably strengthened. There can be given as a concrete method for strengthening stirring, a method described in JP-A-62-183460, in which a jet stream of a processing solution is struck against an emulsion side of light-sensitive material, a method described in JP-A-62-183461, in which a stirring effect is increased with a rotating means, a method in which a stirring effect is improved by moving a light-sensitive material while contacting an emulsion layer side thereof to a wiper blade provided in the processing solution to cause a turbulent flow on an emulsion layer surface, and a method in which a circulating flow amount of a whole processing solution is increased. Such methods for improving stirring are effective in any of a bleaching solution, a bleach-fixing solution and a fixing solution. The improvement in stirring is considered to accelerate the supply of the bleaching agent and fixing agent to an emulsion layer and to result in increasing a desilvering speed. Further, the above means for the improvement in stirring are more effective when a bleaching accelerator is used and makes it possible to markedly increase an acceleration effect and prevent an action of disturbing fixing, which is caused by the bleaching accelerator.

An automatic developing machine used in the present invention is preferably equipped with a light-sensitive material transporting means described in JP-A-60-191257, JP-A-60-191258 and JP-A-60-191259. As described in above JP-A-60-191257, such transporting means can notably reduce an amount of a processing solution carried over from a front bath to a rear bath to increase an effect of preventing the deterioration of the properties of a processing solution. Such effect contributes especially to shortening a processing time in each step and reducing a replenishing amount of a processing solution.

The silver halide color light-sensitive material of the present invention is generally subjected to a washing step and/or a stabilizing step after a desilvering step. An amount of washing water in the washing step can be settled in a wide range according to the various conditions such as the characteristics of a light-sensitive material (for example, depending on the additives such as a coupler), the applications thereof, a temperature of washing water, the number of a washing tanks (the number of stages), a replenishing manner such as a counter-current or regular current, and others. The relationship of the number of the tanks for washing to a water quantity in the multi-stage counter-current flow system can be obtained by the method described in the Journal of the Society of Motion Picture and Television Engineers, Vol. 64, pp. 248 to 253 (May 1955).

The amount of washing water can be decreased to a large extent according to the multi-stage counter-current flow system described in the above literature. However, the prolongation in a staying time of water in the tanks results in growth of bacteria to cause the problem that the floating matters formed thereby stick to the light-sensitive material. In the processing of the light-sensitive material of the present invention, the method for reducing calcium and magnesium ions described in JP-A-62-288838 can be quite effectively used as the means for solving such problem. Also, there can be used the isothiazolone compounds and thiabendazoles described in JP-A-57-8542, a chlorinated bactericide such as chlorinated sodium isocyanurate, and benzotriazoles and other bactericides described in "Chemistry of Antibacteria and Anti-mold" written by H. Horiguchi, published by Sankyo Co. (1986), "Disinfection and Anti-mold Technology of Microbials" published by Hygiene Technology Institute (1982), Industrial Technology Society, and "Bactericide and Fungicide Dictionary" published by Nippon Anti-bacteria and Anti-mold Society (1986).

Washing water in the processing of the light-sensitive material of the present invention has pH of 4 to 9, preferably 5 to 8. A washing temperature and a washing time also can be variously settled according to the characteristics of a light-sensitive material and the applications thereof. In general, there are selected the ranges of 15° to 45° C. and 20 seconds to 10 minutes, preferably 25° to 40° C. and 30 seconds to 5 minutes. Further, the light-sensitive material of the present invention can also be directly processed in a stabilizing solution in place of a washing water. In such a stabilizing processing, there can be used all of the publicly known methods described in JP-A-57-8543, JP-A-58-14834, and JP-A-60-220345.

In some cases, a stabilizing processing is further carried out following the above washing processing, and there can be given as the example thereof, a stabilizing bath used as the final bath for a light-sensitive material for photographing, which contains a dye stabilizer and a surface active agent. There can be given as the dye stabilizer, aldehydes such formalin and glutaraldehyde, N-methylol compounds, hexamethylenetetramine, and aldehyde sulfurous acid adducts. Various chelating agents and antimold agents can be added also to this stabilizing bath.

An overflowed solution generated in the replenishing of the above washing and/or stabilizing solutions can be reused in the other steps such as a desilvering step.

Where the above processing solutions are concentrated due to vaporization in the processing with an automatic development machine, water is preferably added to correct a concentration.

A color developing agent may be incorporated into the silver halide color light-sensitive material of the present invention for the purposes of a simplification and an acceleration of the processing. Various precursors of the developing agents are preferably used for the incorporation thereof. For example, there can be given the indoaniline type compounds described in U.S. Pat. No. 3,342,597, the Schiff base type compounds described in U.S. Pat. No. 3,342,599, and *Research Disclosure* No. 14,850 and No. 15,159, the aldol compounds described in *Research Disclosure* No. 13,924, the metal salt complexes described in U.S. Pat. No. 3,719,492, and the urethane type compounds described in JP-A-53-135628.

Various 1-phenyl-3-pyrazolidones may be incorporated into the silver halide color light-sensitive material of the present invention for the purpose of accelerating a color development according to necessity. The typical compounds are described in JP-A-56-64339, JP-A-57-144547, and JP-A-58-115438.

In the present invention, various processing solutions are used at 10° to 50° C. Usually, the temperature of 33° to 38° C. is a standard. Meanwhile, the temperature is set higher to accelerate a processing for shortening a processing time. On the contrary, the temperature can be set lower to achieve the increase in an image quality and the improvements in a stability of a processing solution.

The silver halide light-sensitive material of the present invention can be applied also to a heat developable light-sensitive material described in U.S. Pat. No. 4,500,626, JP-A-60-133449, JP-A-59-218443 and JP-A-61-238056, and EP-A-210660.

The present invention will be explained in further detail with reference to the examples but is not limited thereto.

EXAMPLE 1

The respective layers having the following compositions were coated in a multilayer on a cellulose triacetate film support provided with a subbing layer, whereby a multilayer color light-sensitive material Sample 101 was prepared.

Compositions of the Light-Sensitive Layers

The numerals corresponding to the respective components show the coated amounts expressed in term of g/m², provided that the coated amounts of the sensitizing dyes are expressed in term of mole per mole of silver halide contained in the same layer.

Sample 101

| First layer (anti-halation layer) | | |
|---|---|---|
| Black colloidal silver | silver | 0.18 |
| Gelatin | | 1.40 |
| Second layer (intermediate layer) | | |
| 2,5-Di-t-pentadecyl hydroquinone | | 0.18 |
| EX-1 | | 0.18 |
| EX-3 | | 0.020 |
| EX-12 | | $2.0 \times 10^{-3}$ |
| U-1 | | 0.060 |
| U-2 | | 0.080 |
| U-3 | | 0.10 |
| HBS-1 | | 0.10 |
| HBS-2 | | 0.020 |
| Gelatin | | 1.04 |
| Third layer (1st red-sensitive layer) | | |
| Emulsion A | silver | 0.25 |
| Emulsion B | silver | 0.25 |
| Sensitizing dye I | | $6.9 \times 10^{-5}$ |
| Sensitizing dye II | | $1.8 \times 10^{-5}$ |
| Sensitizing dye III | | $3.1 \times 10^{-4}$ |
| EX-2 | | 0.17 |
| EX-10 | | 0.020 |
| EX-14 | | 0.17 |
| U-1 | | 0.070 |
| U-2 | | 0.050 |
| U-3 | | 0.070 |
| HBS-1 | | 0.060 |
| Gelatin | | 0.87 |
| Fourth layer (2nd red-sensitive layer) | | |
| Emulsion G | silver | 1.00 |
| Sensitizing dye I | | $5.1 \times 10^{-5}$ |
| Sensitizing dye II | | $1.4 \times 10^{-5}$ |
| Sensitizing dye III | | $2.3 \times 10^{-4}$ |
| EX-2 | | 0.20 |
| EX-3 | | 0.050 |
| EX-10 | | 0.015 |
| EX-14 | | 0.20 |
| EX-15 | | 0.050 |
| U-1 | | 0.070 |
| U-2 | | 0.050 |
| U-3 | | 0.070 |
| Gelatin | | 1.30 |
| Fifth layer (3rd red-sensitive layer) | | |
| Emulsion D | silver | 1.60 |
| Sensitizing dye I | | $5.4 \times 10^{-5}$ |
| Sensitizing dye II | | $1.4 \times 10^{-5}$ |
| Sensitizing dye III | | $2.4 \times 10^{-4}$ |
| EX-2 | | 0.097 |
| EX-3 | | 0.010 |
| EX-4 | | 0.080 |
| HBS-1 | | 0.22 |
| HBS-2 | | 0.10 |
| Gelatin | | 1.63 |
| Sixth layer (intermediate layer) | | |
| EX-5 | | 0.040 |
| HBS-1 | | 0.020 |
| Gelatin | | 0.80 |
| Seventh layer (1st green-sensitive layer) | | |
| Emulsion A | silver | 0.15 |
| Emulsion B | silver | 0.15 |
| Sensitizing dye IV | | $3.0 \times 10^{-5}$ |
| Sensitizing dye V | | $1.0 \times 10^{-4}$ |
| Sensitizing dye VI | | $3.8 \times 10^{-4}$ |
| EX-1 | | 0.021 |
| EX-6 | | 0.26 |
| EX 7 | | 0.030 |
| EX-8 | | 0.025 |
| HBS-1 | | 0.10 |
| HBS-3 | | 0.010 |
| Gelatin | | 0.63 |
| Eighth layer (2nd green-sensitive layer) | | |
| Emulsion C | silver | 0.45 |
| Sensitizing dye IV | | $2.1 \times 10^{-5}$ |
| Sensitizing dye V | | $7.0 \times 10^{-5}$ |
| Sensitizing dye VI | | $2.6 \times 10^{-4}$ |
| EX-6 | | 0.094 |
| EX-7 | | 0.026 |
| EX-8 | | 0.018 |

-continued

| | | |
|---|---|---|
| HBS-1 | | 0.16 |
| HBS-3 | | $8.0 \times 10^{-3}$ |
| Gelatin | | 0.50 |
| Ninth layer (3rd green-sensitive layer) | | |
| Emulsion E | silver | 1.20 |
| Sensitizing dye IV | | $3.5 \times 10^{-5}$ |
| Sensitizing dye V | | $8.0 \times 10^{-5}$ |
| Sensitizing dye VI | | $3.0 \times 10^{-4}$ |
| EX 1 | | 0.013 |
| EX-11 | | 0.065 |
| EX-13 | | 0.019 |
| HBS-1 | | 0.25 |
| HBS-2 | | 0.10 |
| Gelatin | | 1.54 |
| Tenth layer (yellow filter layer) | | |
| Yellow colloidal silver | silver | 0.050 |
| EX-5 | | 0.12 |
| HBS-1 | | 0.08 |
| Gelatin | | 0.95 |
| Eleventh layer (1st blue-sensitive layer) | | |
| Emulsion A | silver | 0.080 |
| Emulsion B | silver | 0.070 |
| Emulsion F | silver | 0.070 |
| Sensitizing dye VII | | $3.5 \times 10^{-4}$ |
| EX-8 | | 0.042 |
| EX-9 | | 0.72 |
| HBS-1 | | 0.28 |
| Gelatin | | 1.10 |
| Twelfth layer (2nd blue-sensitive layer) | | |
| Emulsion G | silver | 0.45 |
| Sensitizing dye VII | | $2.1 \times 10^{-4}$ |
| EX-9 | | 0.15 |

-continued

| | | |
|---|---|---|
| EX-10 | | $7.0 \times 10^{-3}$ |
| HBS-1 | | 0.050 |
| Gelatin | | 0.78 |
| Thirteenth layer (3rd blue-sensitive layer) | | |
| Emulsion H | silver | 0.77 |
| Sensitizing dye VII | | $2.2 \times 10^{-4}$ |
| EX-9 | | 0.20 |
| HBS-1 | | 0.070 |
| Gelatin | | 0.69 |
| Fourteenth layer (1st protective layer) | | |
| Emulsion I | silver | 0.20 |
| U-4 | | 0.11 |
| U-5 | | 0.17 |
| HBS-1 | | $5.0 \times 10^{-2}$ |
| Gelatin | | 1.00 |
| Fifteenth layer (2nd protective layer) | | |
| H-1 | | 0.40 |
| B-1 (diameter: 1.7 μm) | | $5.0 \times 10^{-2}$ |
| B-2 (diameter: 1.7 μm) | | 0.10 |
| B-3 | | 0.10 |
| S-1 | | 0.20 |
| Gelatin | | 1.20 |

Further, W-1, W-2, W-3, B-4, B-5, F-1, F-2, F-3, F-4, F-5, F-6, F-7, F-8, F-9, F-10, F-11, F-12, F-13, an iron salt, a lead salt, a gold salt, a platinum salt, an iridium salt, and a rhodium salt were added to all layers to improve a preservability, a processing property, an anti-pressure property, anti-mold and fungicidal properties, an anti-static property, and a coating property.

TABLE 1

| Emulsion | Average AgI content (%) | Average grain size (μm) | Coefficient of variation (%) | Diameter/thickness ratio | Silver amount (AgI content %) |
|---|---|---|---|---|---|
| A | 4.0 | 0.45 | 27 | 1 | Core/shell = 1/3 (13/1) double structure grains |
| B | 8.9 | 0.70 | 14 | 1 | Core/shell = 3/7 (25/2) double structure grains |
| C | 10 | 0.75 | 30 | 2 | Core/shell = 1/2 (24/3) double structure grains |
| D | 16 | 1.05 | 35 | 2 | Core/shell = 4/6 (40/0) double structure grains |
| E | 10 | 1.05 | 35 | 3 | Core/shell = 1/2 (24/3) double structure grains |
| F | 4.0 | 0.25 | 28 | 1 | Core/shell = 1/3 (13/1) double structure grains |
| G | 14.0 | 0.75 | 25 | 2 | Core/shell = 1/2 (42/0) double structure grains |
| H | 14.5 | 1.30 | 25 | 3 | Core/shell = 37/63 (34/3) double structure grains |
| I | 1 | 0.07 | 15 | 1 | Homogeneous grains |

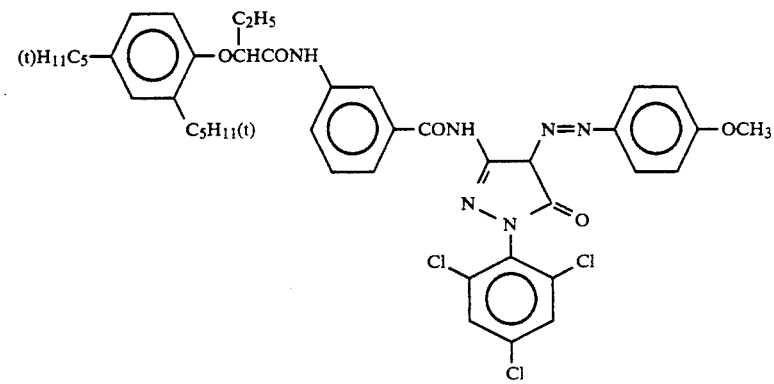

EX-1

-continued
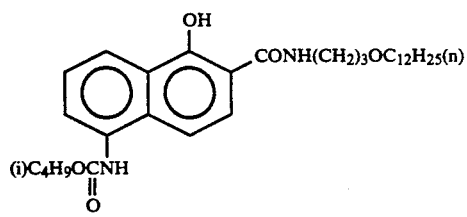
EX-2
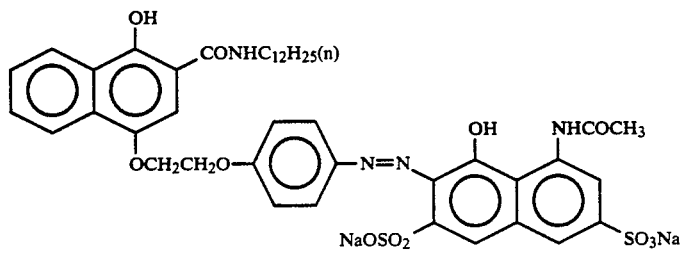
EX-3
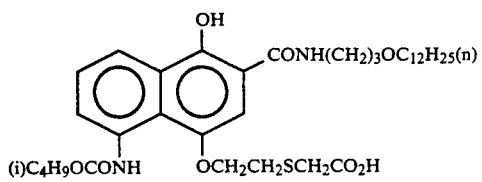
EX-4
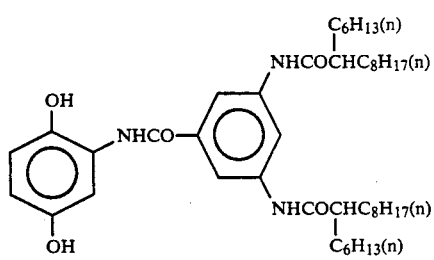
EX-5
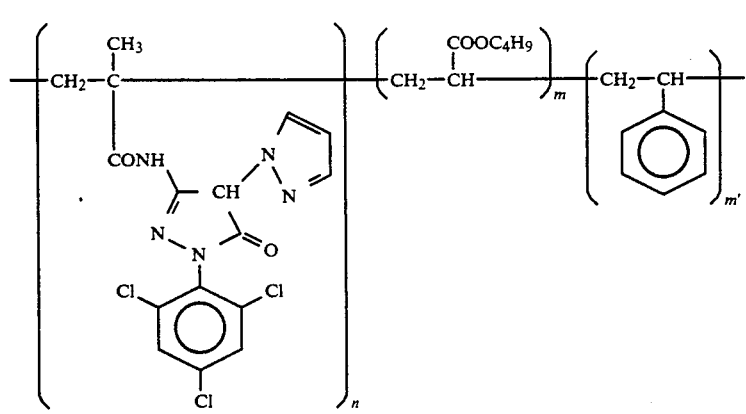
EX-6
n = 50 (% by weight)
m = 25 (% by weight)
m' = 25 (% by weight)
mol. wt. about 20,000

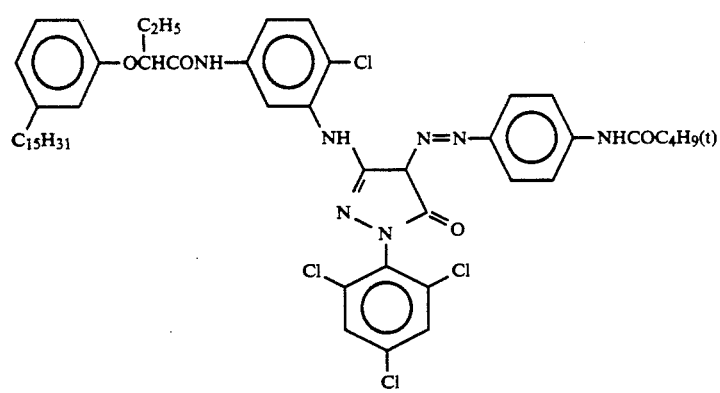
EX-7
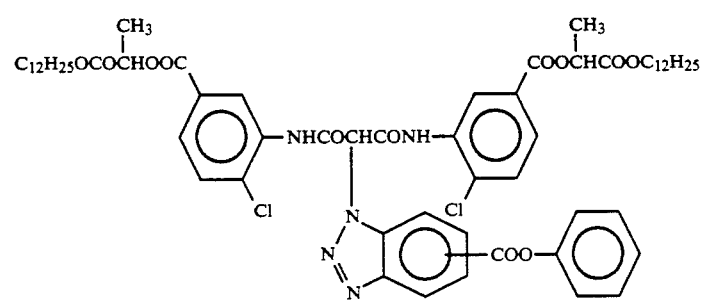
EX-8
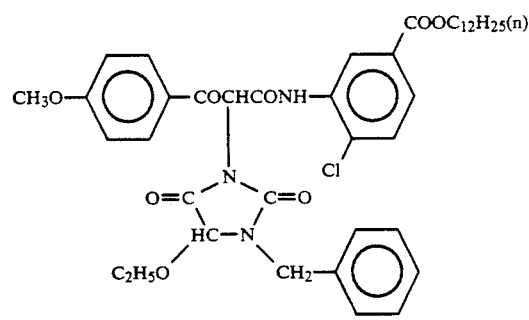
EX-9
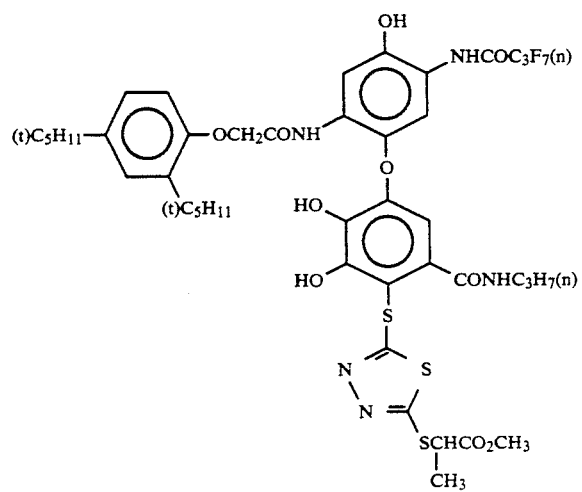
EX-10

EX-11
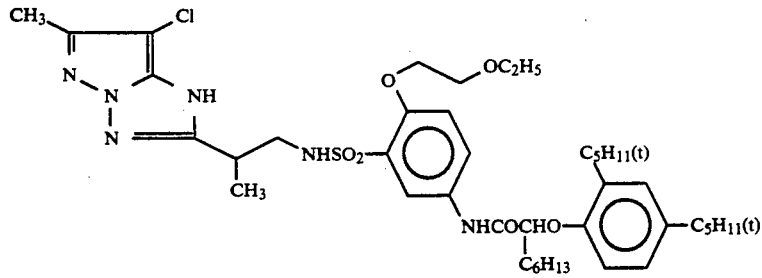
EX-12
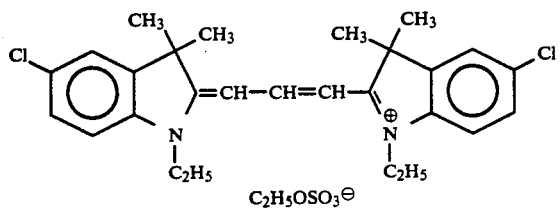
EX-13
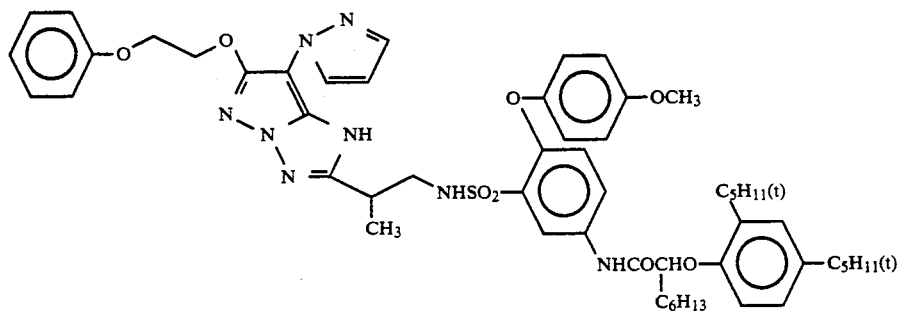
EX-14
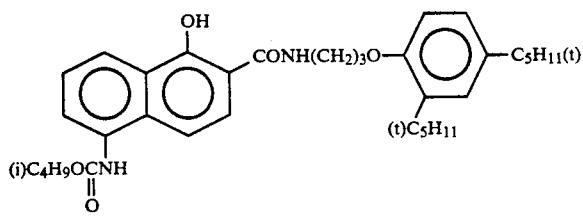
EX-15
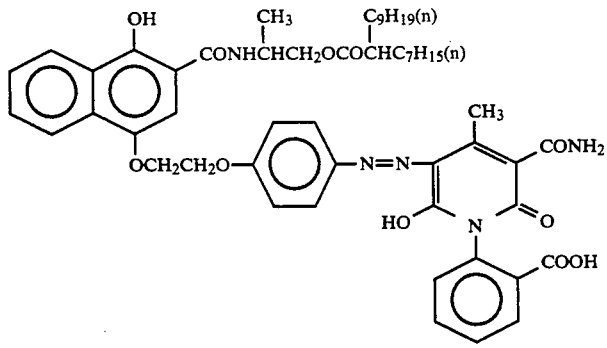
U-1
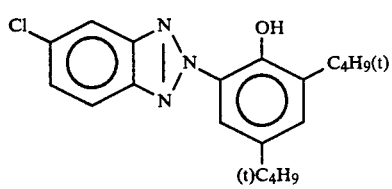

-continued
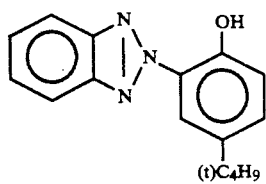 U-2
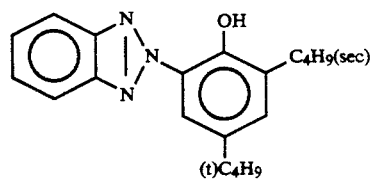 U-3
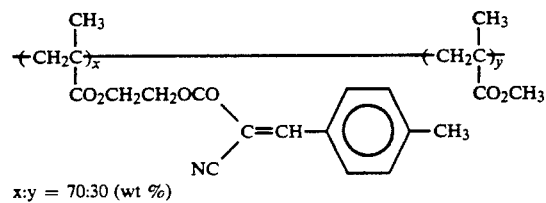 U-4
x:y = 70:30 (wt %)
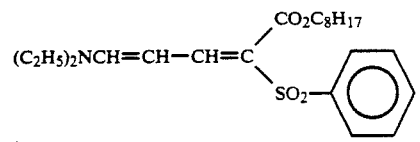 U-5
Tricresyl Phosphate   HBS-1
Di-n-butyl Phthalate   HBS-2
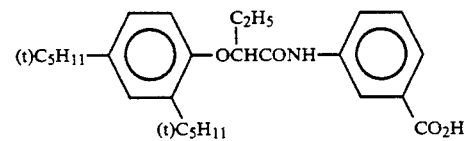 HBS-3
Sensitizing Dye I
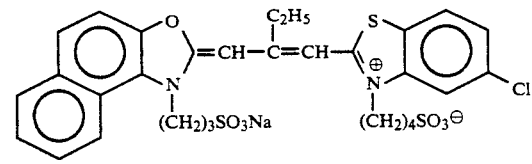
Sensitizing Dye II
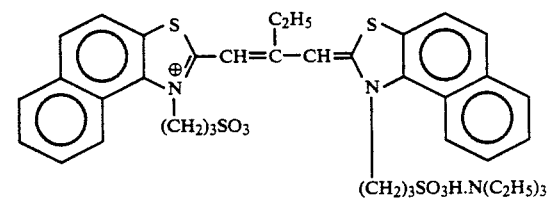
Sensitizing Dye III
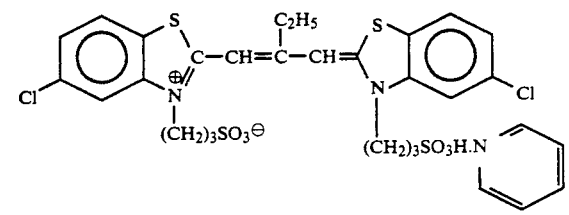

Sensitizing Dye IV
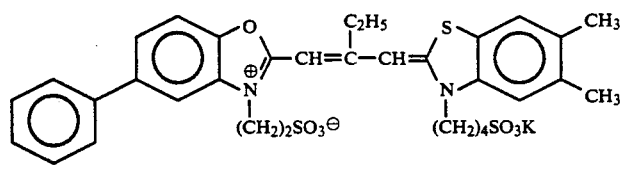
Sensitizing Dye V
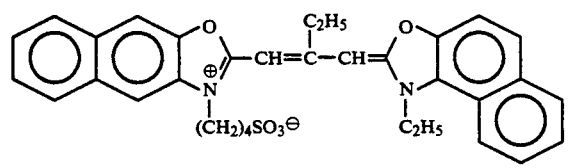
Sensitizing Dye VI
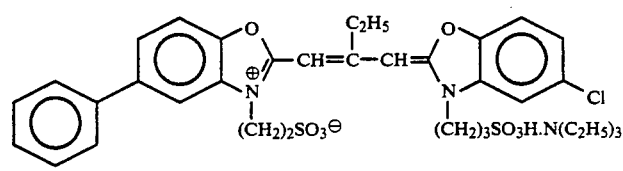
Sensitizing Dye VII
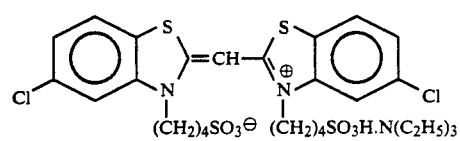
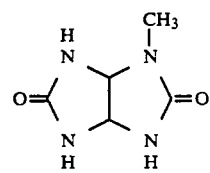   S-1
$CH_2=CH-SO_2-CH_2-CONH-CH_2$   H-1
$CH_2=CH-SO_2-CH_2-CONH-CH_2$
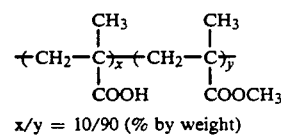   B-1
x/y = 10/90 (% by weight)
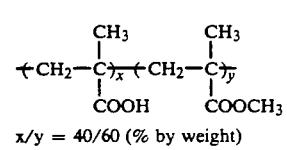   B-2
x/y = 40/60 (% by weight)
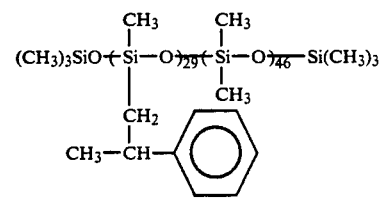   B-3
Numerals are numbers of addition

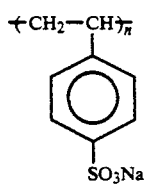 B-4
Number average molecular weight ≈ 340,000
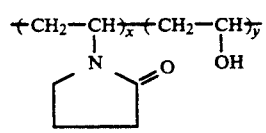 B-5
x/y = 70/30 (% by weight)
 W-1
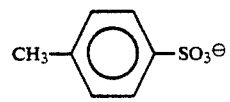 W-2
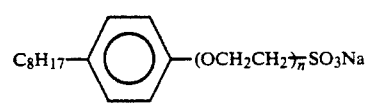 W-3
n = 2~4
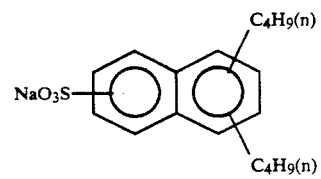 F-1
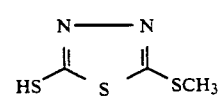 F-2
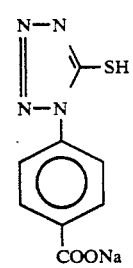 F-3
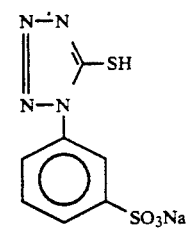 F-4
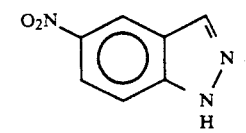

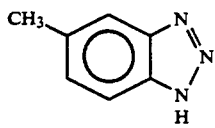 F-5

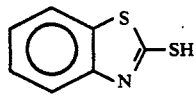 F-6

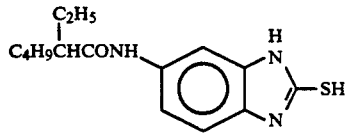 F-7

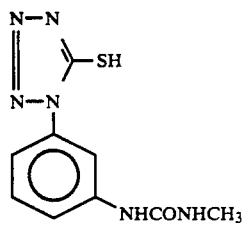 F-8

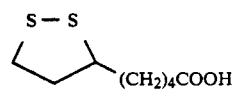 F-9

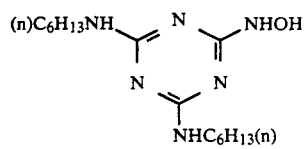 F-10

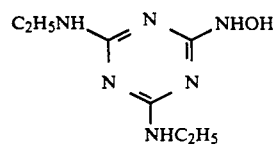 F-11

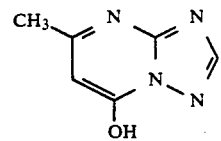 F-12

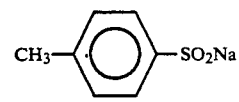 F-13

Next, yellow colloidal silver of the tenth layer in Sample 101 was replaced with 0.20 g/m² of Compound A, whereby Sample 102 was prepared.

Compound A was used by dispersing and emulsifying in gelatin using an appropriate amount of surface active agent by a conventional method after dissolving in a high boiling solvent HBS-1 (0.7 time as much as Compound A by weight) and ethyl acetate.

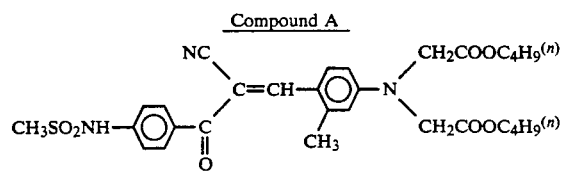

Compound A

Further, Samples 103 to 106 were prepared in the same manner as Sample 102, provided that the above Compound A was replaced with an equimolar amount of Compounds D-9 D-36, D-45, and D-48 according to the present invention.

The samples thus prepared were exposed to a white light via an optical wedge and then was processed with an automatic developing machine in the following manner (the processing was continued until an accumulative replenishing amount reached three times the tank capacity of a mother solution).

| Step | Time | Processing method (A) Temperature (°C.) | Replenishing amount (ml) | Tank capacity (l) |
|---|---|---|---|---|
| Color developing | 3 minutes & 15 seconds | 38 | 33 | 20 |
| Bleaching | 6 minutes & 30 seconds | 38 | 25 | 40 |
| Washing | 2 minutes & 10 seconds | 24 | 1200 | 20 |
| Fixing | 4 minutes & 20 seconds | 38 | 25 | 30 |
| Washing (1) | 1 minute & 5 seconds | 24 | * | 10 |
| Washing (2) | 1 minute | 24 | 1200 | 10 |
| Stabilizing | 1 minute & 5 seconds | 38 | 25 | 10 |
| Drying | 4 minutes & 20 seconds | 55 | | |

*A counter-current system from (2) to (1).
Replenishing amount is per meter of 35 mm width.

The compositions of the processing solutions are shown below:

| | A | B |
|---|---|---|
| Color developing solution | | |
| Diethylenetriaminepentaacetic acid | 1.0 g | 1.1 g |
| 1-Hydroxyethylidene-1,1-diphosphonic acid | 3.0 g | 3.2 g |
| Sodium sulfite | 4.0 g | 4.4 g |
| Potassium carbonate | 30.0 g | 37.0 g |
| Potassium bromide | 1.4 g | 0.7 g |
| Potassium iodide | 1.5 mg | — |
| Hydroxylamine sulfate | 2.4 g | 2.8 g |
| 4-[N-ethyl-N-$\beta$-hydroxyethyl amino]-2-methylaniline sulfate | 4.5 g | 5.5 g |
| Water to make | 1.0 l | 1.0 l |
| pH | 10.05 | 10.10 |
| Bleaching solution | | |
| Sodium ethylenediaminetetraacetato ferrate trihydrate | 100.0 g | 120.0 g |
| Disodium ethylenediaminetetraacetate | 10.0 g | 10.0 g |
| Ammonium bromide | 140.0 g | 160.0 g |
| Ammonium nitrate | 30.0 g | 35.0 g |
| Ammonia water (27%) | 6.5 ml | 4.0 ml |
| Water to make | 1.0 l | 1.0 l |
| pH | 6.0 | 5.7 |
| Fixing solution | | |
| Disodium ethylenediamine tetraacetate | 0.5 g | 0.7 g |
| Sodium sulfite | 7.0 g | 8.0 g |
| Sodium bisulfite | 5.0 g | 5.5 g |
| Ammonium thiosulfate aqueous solution (70%) | 170.0 ml | 200.0 ml |
| Water to make | 1.0 l | 1.0 l |
| pH | 6.7 | 6.6 |
| Stabilizing solution | | |
| Formalin (37%) | 2.0 ml | 3.0 ml |
| Polyoxyethylene-p-monononylphenyl ether (average polymerization degree: 10) | 0.3 g | 0.45 g |
| Disodium ethylenediamine tetraacetate | 0.05 g | 0.08 g |
| Water to make | 1.0 l | 1.0 l |

| | A | B |
|---|---|---|
| pH | 5.0–8.0 | 5.0–8.0 |

Note:
A: mother solution
B: replenishing solution

After processing, the respective samples were subjected to a measurement of a density, wherein a fog density [$D_B$ (min)] of a blue-sensitive layer was expressed by a value relative to that of Sample 101 to evaluate a decoloring property of a dye [$\Delta D_B$ (min)].

Also, a sensitivity of a green-sensitive layer was defined by a logarithm of a reciprocal of an exposure necessary to give a density of fog+0.2 and expressed by a value relative to that of Sample 101.

The above evaluation results are shown in Table 2.

TABLE 2

| Sample No. | $\Delta D_B$ (min) | Sensitivity* |
|---|---|---|
| 101 (Comp.) | ± | ± |
| 102 (Comp.) | +0.18 | +0.07 |
| 103 (Inv.) | 0.0 | +0.09 |
| 104 (Inv.) | 0.0 | +0.08 |
| 105 (Inv.) | 0.0 | +0.07 |
| 106 (Inv.) | 0.0 | +0.08 |

*Relative sensitivity in a green-sensitive layer.

As is apparent from the results summarized in Table 2, the samples of the present invention give $\Delta D_B$ (min) equivalent to that of Sample 101, which means that they have an excellent decoloring property. Further, the sensitivity of a green-sensitive layer can be increased in the samples of the present invention. This is due to an excellent absorption property of a dye.

EXAMPLE 2

The samples were prepared and evaluated in the same manners as Example 1, provided that the processing steps were replaced with the ones shown below.

The results show that similarly to Example 1, the samples of the present invention had no problems in $\Delta D_B$ (min) and an increased sensitivity of a green-sensitive layer, while Sample 102 gave a further larger $\Delta D_B$ (min) and had a problem in a decoloring property.

| Step | Time | Processing method (B) Temperature (°C.) | Replenishing amount (ml) | Tank capacity (l) |
|---|---|---|---|---|
| Color developing | 3 minutes & 15 seconds | 37.8 | 25 | 10 |
| Bleaching | 45 seconds | 38 | 5 | 4 |
| Bleach-fixing (1) | 45 seconds | 38 | — | 4 |
| Bleach-fixing (2) | 45 seconds | 38 | 30 | 4 |
| Washing (1) | 20 seconds | 38 | — | 2 |
| Washing (2) | 20 seconds | 38 | 30 | 2 |
| Stabilizing | 20 seconds | 38 | 20 | 2 |
| Drying | 1 minute | 55 | | |

Replenishing amount is per meter of 35 mm width.

The respective steps of bleach-fixing and washing were carried out by a counter-current system from (2) to (1), and all of an overflowed bleaching solution was introduced in the bleach-fixing solution (2).

An amount of a bleach-fixing solution carried over to a washing bath was 2 ml per meter of a light-sensitive material with 35 mm width.

|  | A | B |
| --- | --- | --- |
| Color developing solution | | |
| Diethylenetriaminepentaacetic acid | 5.0 g | 6.0 g |
| Sodium sulfite | 4.0 g | 5.0 g |
| Potassium carbonate | 30.0 g | 37.0 g |
| Potassium bromide | 1.3 g | 0.5 g |
| Potassium iodide | 1.2 mg | — |
| Hydroxylamine sulfate | 2.0 g | 3.6 g |
| 4-(N-ethyl-N-$\beta$-hydroxyethylamino)-2-methylaniline sulfate | 4.7 g | 6.2 g |
| Water to make | 1.0 l | 1.0 l |
| pH | 10.00 | 10.15 |
| Bleaching solution | | |
| Ammonium 1,3-diaminopropane-tetraacetato ferrate monohydrate | 144.0 g | 206.0 g |
| 1,3-Diaminopropanetetracetic acid | 2.8 g | 4.0 g |
| Ammonium bromide | 84.0 g | 120.0 g |
| Ammonium nitrate | 17.5 g | 25.0 g |
| Ammonia water (27%) | 10.0 g | 1.8 g |
| Acetic acid (98%) | 51.1 g | 73.0 g |
| Water to make | 1.0 l | 1.0 l |
| pH | 4.3 | 3.4 |
| Bleach-fixing solution | | |
| Ammonium ethylenediaminetetra-acetato ferrate dihydrate | 50.0 g | — |
| Disodium ethylenediamine-tetraacetate | 5.0 g | 25.0 g |
| Ammonium sulfite | 12.0 g | 20.0 g |
| Ammonium thiosulfate aqueous solution (700 g/liter) | 290.0 ml | 320.0 ml |
| Ammonia water (27%) | 6.0 ml | 15.0 ml |
| Water to make | 1.0 l | 1.0 l |
| pH | 6.8 | 8.0 |
| Washing water | (common to both of the mother solution and replenishing solution) | |

Note:
A: mother solution
B: replenishing solution

City water was introduced into a mixed bed type column filled with H-type strong acidic cation exchange resins (Amberlite IR-120B) and OH type strong base anion exchange resins (Amberlite IRA-400) each manufactured by Rohm & Haas Co., Ltd. to reduce the ion concentrations of calcium and magnesium to 3 mg/liter or less, and subsequently sodium dichloroisocyanurate 20 mg/liter and sodium sulfate 150 mg/liter were added. The pH range of this solution was 6.5 to 7.5.

| Stabilizing solution | (common to both of the mother solution and replenishing solution) |
| --- | --- |
| Formalin (37%) | 12 ml |
| Surface active agent $C_{10}H_{21}$—O—$(CH_2CH_2O)_{10}$—H | 0.4 g |
| Ethylene glycol | 1.0 g |
| Water to make | 1.0 l |
| pH | 5.0 to 7.0 |

EXAMPLE 3

The samples were prepared and processed in the same manners as Sample 102 in Example 1, provided that Compound A was replaced by Compounds D-78 and D-81.

These samples had an excellent decoloring property and an increased sensitivity in a green-sensitive layer.

EXAMPLE 4

Synthesis of D-38

The mixture of 3-(4-methanesulfonamidephenyl)-2-isoxazoline-5-one (3.8 g), 3-formyl-1-normal propylindole (3.2 g) and ethanol (60 ml) was heated for refluxing for two hours. The reaction mixture was cooled to filter and collect a deposited crystal, followed by drying, whereby D-38 (3.6 g) was obtained.

Melting point: 191° to 193° C. $\lambda$max: 428 nm (AcOEt).

EXAMPLES 5 TO 14

The following dyes were prepared in the same manner as Example 4:

| Dye | $\lambda$max (AcOEt) | Melting point |
| --- | --- | --- |
| D-27 | 422 nm | 224 to 225° C. |
| D-83 | 420 nm | 213 to 214° C. |
| D-24 | 422 nm | 204 to 206° C. |
| D-47 | 428 nm | 215 to 216° C. |
| D-57 | 426 nm | 156 to 157° C. |
| D-23 | 424 nm | 189 to 191° C. |
| D-71 | 420 nm | 130 to 133° C. |
| D-66 | 420 nm | 208° C. |
| D-69 | 428 nm | 215° C. |
| D-78 | 425 nm | 119 to 123° C. |

EXAMPLE 15

Synthesis of D-84

The mixture of 3-(4-methanesulfonamidophenyl)-2-isoxazoline-5-one (2.6 g), 3-formyl-1-[3-N,N bis(methoxycarbonylethyl)aminopropyl]indole (3.3 g) and methanol (50 ml) was heated for refluxing for two hours. The reaction solution was concentrated under a reduced pressure and then was subjected to a refining with a silica chromatography, whereby D-84 (4.0 g) was obtained. It was a starch syrup-like compound.

EXAMPLE 16

Synthesis of D-22

D-22 was prepared by the same synthetic method as in Example 15. $\lambda$max: 428 nm (AcOEt). Melting point: 119° to 120° C.

EXAMPLE 17

Synthesis of D-55

The mixture of 3-(4-benzenesulfonamido)phenylisoxazoline-5-one (3.2 g), 1-(t-butoxycarbonylmethyl)-3-formylindole 2.6 g and acetonitrile 50 ml was heated for refluxing for three hours. The deposited crystals were filtered and collected, followed by drying, whereby D-55 (2.4 g) was obtained. $\lambda$max: 423 nm (AcOEt).

EXAMPLES 18 TO 20

The following dyes were prepared in the same manner as in Example 17:

| Dye | $\lambda$max (AcOEt) |
| --- | --- |
| D-57 | 427 nm |
| D-70 | 430 nm |
| D-62 | 422 nm |

EXAMPLE 21

Synthesis of D-74

The mixture of 3-(4-toluenesulfonamidophenyl)-isoxazoline-5-one (3.3 g), 3-formylindole (1.5 g) and methanol (50 ml) was heated for refluxing for two hours. The solvent was distilled off for condensation and ethanol 40 ml was then added under heating followed by adding water 40 ml. The deposited crystals were filtered and collected, followed by drying, whereby D-74 (4.1 g) was obtained. Melting point: 176° to 179° C.

EXAMPLES 22 TO 30

The following compounds were synthesized in almost the same manners as in Example 21:

| Dye | Melting point | λmax (AcOEt) |
|---|---|---|
| D-85 | 182 to 183° C. | 426 nm |
| D-73 | 202 to 204° C. | 428 nm |

| Dye | Melting point | λmax (AcOEt) |
|---|---|---|
| D-75 | 210 to 211° C. | 420 nm |
| D-76 | 108 to 111° C. | 428 nm |
| D-59 | 205 to 208° C. | 420 nm |
| D-64 | 101 to 103° C. | 428 nm |
| D-65 | 205 to 209° C. | 420 nm |
| D-29 | 117 to 121° C. | 439 nm |
| D-81 | 110 to 112° C. | 426 nm |

EXAMPLES 31 TO 46

The following compounds were synthesized:

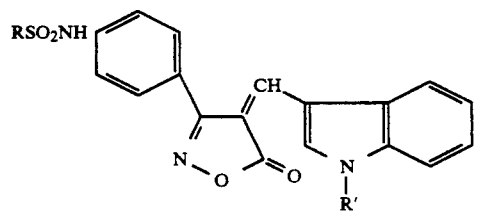

| Compound No. | R | R' | Melting point (°C.) |
|---|---|---|---|
| D-86 | 3,5-bis(CH3O2C)-C6H3— | —CH2CH2CO2CH2-(tetrahydrofuran-2-yl) | 137 to 141 |
| D-87 | 3,5-bis(CH3O2C)-C6H3— | —CH2CH2CO2CH2CH(O)CH2 (epoxide) | 106 to 109 |
| D-88 | 4-(C4H9SO2NH)-C6H4— | —CH2CH2CO2CH2-(tetrahydrofuran-2-yl) | 111 to 113 |
| D-89 | 4-(C4H9SO2NH)-C6H4— | —CH2CH2CO2C2H5 | 194 to 196 |
| D-90 | 4-(CH3C(O)NH)-C6H4— | —CH2CH2CO2C2H5 | 230 to 231 |
| D-91 | 4-Cl-C6H4— | —CH2CH2CO2CH2CH2OCOCH3 | 175 to 177 |
| D-92 | C2H5CH(CO2C3H7)— | —CH2CH2CO2CH2-(tetrahydrofuran-2-yl) | about 40 |
| D-93 | CH3 | —CH2CH2CO2CH2CH2OP(O)(OC6H5)2 | 62 to 66 |

-continued

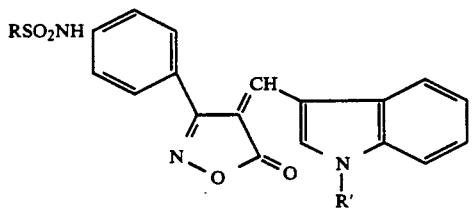

| Compound No. | R | R' | Melting point (°C.) |
|---|---|---|---|
| D-94 | phenyl | —CH$_2$CH$_2$CO$_2$CH$_2$-(tetrahydropyran-2-yl) | 203 to 205 |
| D-95 | C$_2$H$_5$CH(CO$_2$C$_4$H$_9$)— | —CH$_2$CH$_2$CO$_2$C$_2$H$_5$ | 52 to 54 |
| D-96 | phenyl | —CH$_2$CH$_2$CO$_2$C(CH$_3$)$_2$COCH$_3$ | 203 to 206 |
| D-97 | phenyl | —CH$_2$CH(CH$_3$)CO$_2$C$_2$H$_5$ | 218 to 219 |
| D-98 | CH$_3$ | —CH$_2$CH$_2$CO$_2$CH$_2$-phenyl | 163 to 164 |
| D-99 | CH$_3$ | —CH$_2$CH$_2$CO$_2$CH$_2$CF$_2$CF$_2$H | 198 to 200 |
| D-100 | 4-O$_2$N-phenyl | —CH$_2$CH$_2$CO$_2$C$_2$H$_5$ | 95 to 99 |
| D-101 | 3,5-bis(CH$_3$O$_2$C)-phenyl | —CH$_2$CH$_2$CN | 219 to 222 |

EXAMPLE 47

Preparation of Sample 401

The respective layers having the following compositions were provided on a 127 μm thick cellulose triacetate film support having thereon a subbing layer to thereby prepare a multi-layered color light-sensitive material Sample 401. The addition amounts are expressed in terms of per m$^2$ and those of colloidal silver and silver halides are expressed in terms of the amounts converted to silver. The effect of the compound added is not limited to that as described.

| First layer: an anti-halation layer | |
|---|---|
| Black colloidal silver | 0.20 g |
| Gelatin | 1.9 g |
| UV absorber U-1 | 0.1 g |
| UV absorber U-3 | 0.04 g |
| UV absorber U-4 | 0.1 g |
| High-boiling solvent Oil-1 | 0.1 g |
| Second layer: an intermediate layer | |
| Gelatin | 0.40 g |
| Compound Cpd-C | 5 mg |
| Compound Cpd-J | 5 mg |
| Compound Cpd-K | 3 mg |
| High-boiling solvent Oil-3 | 0.1 g |
| Dye D-4 | 0.4 mg |
| Third layer: an intermediate layer | |
| Silver iodobromide fine grains whose surface and inside were fogged (average grain size: 0.06 μm, a coefficient of variation: 18%, AgI content: 1 mole %) | 0.05 g |
| Gelatin | 0.4 g |

| Fourth layer: a low red-sensitive layer | |
|---|---|
| Emulsion A | 0.15 g |
| Emulsion B | 0.35 g |
| Gelatin | 0.8 g |
| Coupler C-1 | 0.15 g |
| Coupler C-2 | 0.05 g |
| Coupler C-3 | 0.05 g |
| Coupler C-9 | 0.05 g |
| Compound Cpd-C | 10 mg |
| High-boiling solvent Oil-2 | 0.1 g |
| Additive P-1 | 0.1 g |
| Fifth layer: a medium red-sensitive layer | |
| Emulsion B | 0.25 g |
| Emulsion C | 0.25 g |
| Gelatin | 0.8 g |
| Coupler C-1 | 0.2 g |
| Coupler C-2 | 0.05 g |
| Coupler C-3 | 0.2 g |
| High-boiling solvent Oil-2 | 0.1 g |
| Additive P-1 | 0.1 g |
| Sixth layer: a high red-sensitive layer | |
| Emulsion D | 0.4 g |
| Gelatin | 1.1 g |
| Coupler C-1 | 0.3 g |
| Coupler C-2 | 0.1 g |
| Coupler C-3 | 0.7 g |
| Additive P-1 | 0.1 g |
| Seventh layer: an intermediate layer | |
| Gelatin | 0.6 g |
| Additive M-1 | 0.3 g |
| Color stain preventing agent Cpd-I | 2.6 mg |
| UV absorber U-1 | 0.01 g |
| UV absorber U-2 | 0.002 g |
| UV absorber U-5 | 0.01 g |
| Dye D-1 | 0.02 g |
| Compound Cpd-C | 5 mg |
| Compound Cpd-J | 5 mg |
| Compound Cpd-K | 5 mg |
| High-boiling solvent Oil-3 | 0.02 g |
| Eighth layer: an intermediate layer | |
| Silver iodobromide grains whose surface and inside were fogged (average grain size: 0.06 μm, a coefficient of variation: 16%, AgI content: 0.3 mole %) | 0.02 g |
| Gelatin | 1.0 g |
| Additive P-1 | 0.2 g |
| Color stain preventing agent Cpd-A | 0.1 g |
| Ninth layer: a low green-sensitive layer | |
| Emulsion E | 0.2 g |
| Emulsion F | 0.1 g |
| Emulsion G | 0.2 g |
| Gelatin | 0.5 g |
| Coupler C-4 | 0.1 g |
| Coupler C-7 | 0.05 g |
| Coupler C-8 | 0.20 g |
| Compound Cpd-B | 0.03 g |
| Compound Cpd-C | 10 mg |
| Compound Cpd-D | 0.02 g |
| Compound Cpd-E | 0.02 g |
| Compound Cpd-F | 0.02 g |
| Compound Cpd-G | 0.02 g |
| High-boiling solvent Oil-1 | 0.1 g |
| High-boiling solvent Oil-2 | 0.1 g |
| Tenth layer: a medium green-sensitive layer | |
| Emulsion G | 0.3 g |
| Emulsion H | 0.1 g |
| Gelatin | 0.6 g |
| Coupler C-4 | 0.1 g |
| Coupler C-7 | 0.2 g |
| Coupler C-8 | 0.1 g |
| Compound Cpd-B | 0.03 g |
| Compound Cpd-D | 0.02 g |
| Compound Cpd-E | 0.02 g |
| Compound Cpd-F | 0.05 g |
| Compound Cpd-G | 0.05 g |
| High-boiling solvent Oil-2 | 0.01 g |
| Eleventh layer: a high green-sensitive layer | |
| Emulsion I | 0.5 g |
| Gelatin | 1.0 g |
| Coupler C-4 | 0.3 g |
| Coupler C-7 | 0.1 g |
| Coupler C-8 | 0.1 g |
| Compound Cpd-B | 0.08 g |
| Compound Cpd-C | 5 mg |
| Compound Cpd-D | 0.02 g |
| Compound Cpd-E | 0.02 g |
| Compound Cpd-F | 0.02 g |
| Compound Cpd-G | 0.02 g |
| Compound Cpd-J | 5 mg |
| Compound Cpd-K | 5 mg |
| High-boiling solvent Oil-1 | 0.02 g |
| High boiling solvent Oil-2 | 0.02 g |
| Twelfth layer: an intermediate layer | |
| Gelatin | 0.6 g |
| Thirteenth layer: a yellow filter layer | |
| Yellow colloidal silver | 0.07 g |
| Gelatin | 1.1 g |
| Color stain preventing agent Cpd-A | 0.01 g |
| High-boiling solvent Oil-1 | 0.01 g |
| Fourteenth layer: an intermediate layer | |
| Gelatin | 0.6 g |
| Fifteenth layer: a low blue-sensitive layer | |
| Emulsion J | 0.2 g |
| Emulsion K | 0.3 g |
| Emulsion L | 0.1 g |
| Gelatin | 0.8 g |
| Coupler C-5 | 0.2 g |
| Coupler C-6 | 0.1 g |
| Coupler C-10 | 0.4 g |
| Sixteenth layer: a medium blue-sensitive layer | |
| Emulsion L | 0.15 g |
| Emulsion M | 0.4 g |
| Gelatin | 0.9 g |
| Coupler C-5 | 0.3 g |
| Coupler C-6 | 0.1 g |
| Coupler C-10 | 0.1 g |
| Seventeenth layer: a high blue-sensitive layer | |
| Emulsion N | 0.35 g |
| Gelatin | 1.2 g |
| Coupler C-5 | 0.3 g |
| Coupler C-6 | 0.6 g |
| Coupler C-10 | 0.1 g |
| Eighteenth layer: the first protective layer | |
| Gelatin | 0.7 g |
| UV absorber U-1 | 0.2 g |
| UV absorber U-2 | 0.05 g |
| UV absorber U-5 | 0.3 g |
| Formalin scavenger Cpd-H | 0.4 g |
| Dye D-1 | 0.1 g |
| Dye D-2 | 0.05 g |
| Dye D-3 | 0.1 g |
| Nineteenth layer: the second protective layer | |
| Colloidal silver | 0.1 mg |
| Silver iodobromide fine grains (average grain size: 0.06 μm, AgI content: 1 mole %) | 0.1 g |
| Gelatin | 0.4 g |
| Twentieth layer: the third protective layer | |
| Gelatin | 0.4 g |
| Polymethyl methacrylate (average grain size: 1.5 μm) | 0.1 g |
| Copolymer of methyl methacrylate and acrylic acid (4:6) (average grain size: 1.5 μm) | 0.1 g |
| Silicon oil | 0.03 g |
| Surfactant W-1 | 3.0 mg |
| Surfactant W-2 | 0.03 g |

In addition to the above components, the additives F-1 to F-8 were added to all of the layers. Further, a gelatin hardener H-1 and the surfactants W-3, W-4, W-5 and W-6 for coating and emulsifying besides the above components were added to each of the layers.

Further, phenol, 1,2-benzisothiazoline-3-one, 2-phenoxyethanol, phenethyl alcohol and butyl p-benzoate were added as a fungicide and an anti-mold agent.

The silver iodobromide emulsions used for Sample 401 are shown below:

| Emulsion | Average grain size* (μm) | Coefficient of variation (%) | AgI content (%) |
|---|---|---|---|
| A. Monodisperse tetra-decahedral grains | 0.28 | 16 | 3.7 |
| B. Monodisperse cubic, internal latent image type grains | 0.30 | 10 | 3.3 |
| C. Monodisperse tabular grains, average aspect ratio: 4.0 | 0.38 | 18 | 5.0 |
| D. Tabular grains average aspect ratio: 8.0 | 0.68 | 25 | 2.0 |
| E. Monodisperse cubic grains | 0.20 | 17 | 4.0 |
| F. Monodisperse cubic grains | 0.23 | 16 | 4.0 |
| G. Monodisperse cubic, internal latent image type grains | 0.28 | 11 | 3.5 |
| H. Monodisperse cubic, internal latent image type grains | 0.32 | 9 | 3.5 |
| I. Tabular grains average aspect ratio: 9.0 | 0.80 | 28 | 1.5 |
| J. Monodisperse tetra-decahedral grains | 0.30 | 18 | 4.0 |
| K. Monodisperse tabular grains, average aspect ratio: 7.0 | 0.45 | 17 | 4.0 |
| L. Monodisperse cubic, internal latent image type grains | 0.46 | 14 | 3.5 |
| M. Monodisperse tabular grains, average aspect ratio: 10.0 | 0.55 | 13 | 4.0 |
| N. Tabular grains average aspect ratio: 12.0 | 1.00 | 33 | 1.3 |

*An average value of a diameter of a sphere corresponding to a volume of a grain Spectral sensitization of Emulsions A to N

| Emulsion | Sensitizing dye added | Added amount per mol of AgX (g) |
|---|---|---|
| A | S-1 | 0.025 |
|   | S-2 | 0.25 |
|   | S-7 | 0.01 |
| B | S-1 | 0.01 |
|   | S-2 | 0.25 |
|   | S-7 | 0.01 |
| C | S-1 | 0.02 |
|   | S-2 | 0.25 |
|   | S-7 | 0.01 |
| D | S-1 | 0.01 |
|   | S-2 | 0.10 |
|   | S-7 | 0.01 |
| E | S-3 | 0.5 |
|   | S-4 | 0.1 |
| F | S-3 | 0.3 |
|   | S-4 | 0.1 |
| G | S-3 | 0.25 |
|   | S-4 | 0.08 |
|   | S-8 | 0.05 |
| H | S-3 | 0.2 |
|   | S-4 | 0.06 |
|   | S-8 | 0.05 |
| I | S-3 | 0.3 |
|   | S-4 | 0.07 |
|   | S-8 | 0.1 |
| J | S-6 | 0.2 |
|   | S-5 | 0.05 |
| K | S-6 | 0.2 |
|   | S-5 | 0.05 |
| L | S-6 | 0.22 |
|   | S-5 | 0.06 |
| M | S-6 | 0.15 |
|   | S-5 | 0.04 |
| N | S-6 | 0.22 |
|   | S-5 | 0.06 |

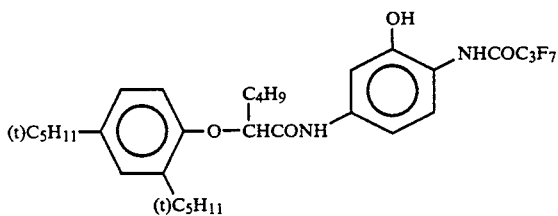

C-1

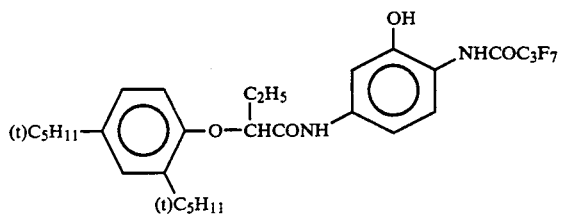

C-2

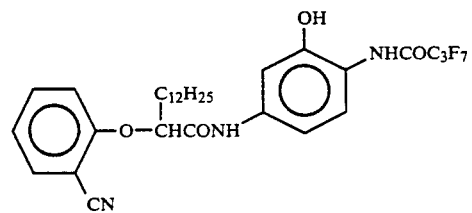

C-3

-continued
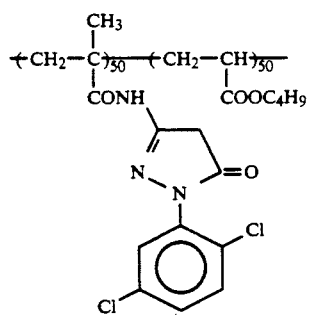
C-4
Numerals are % by weight
Average molecular weight: about 25,000
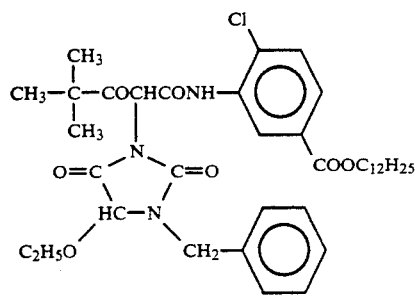
C-5
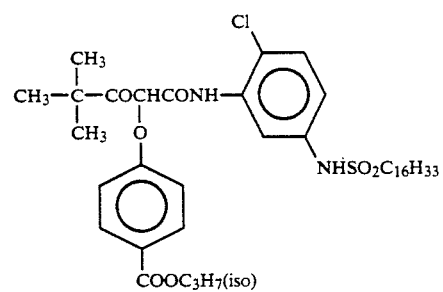
C-6
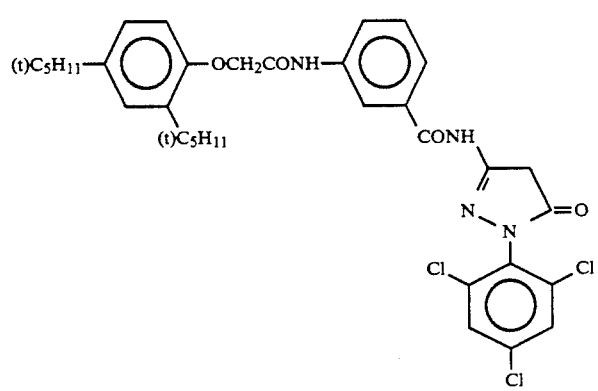
C-7

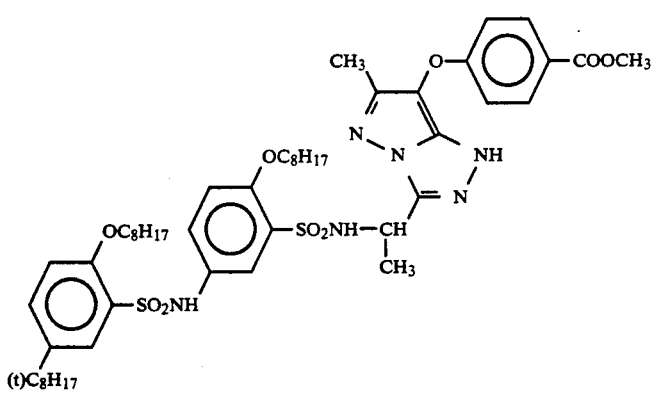
C-8
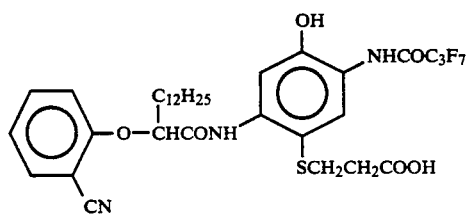
C-9
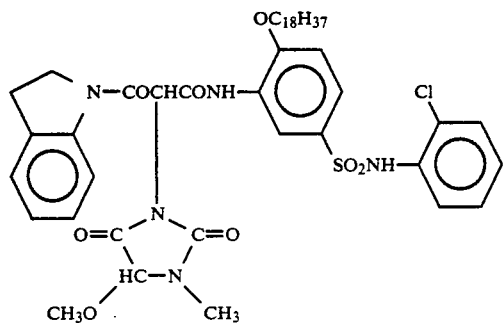
C-10
| Dibutyl Phthalate | Oil-1 |
| Tricresyl Phosphate | Oil-2 |
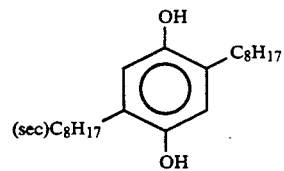
Oil-3
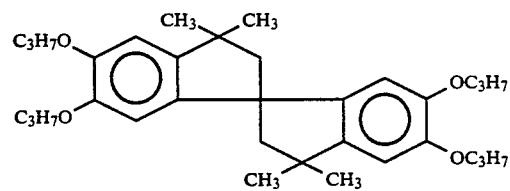
Cpd-A
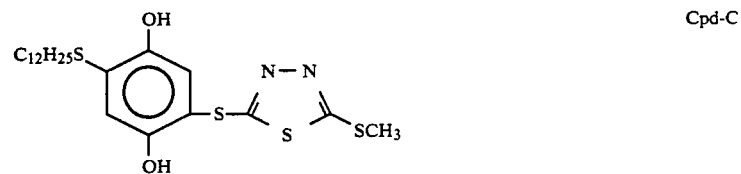
Cpd-B
Cpd-C -continued
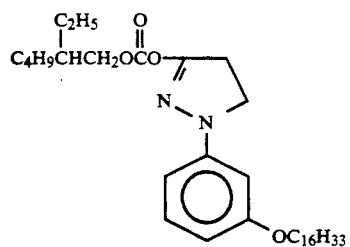
Cpd-D
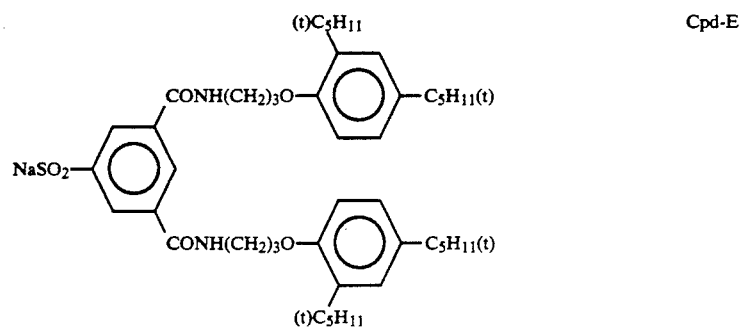
Cpd-E
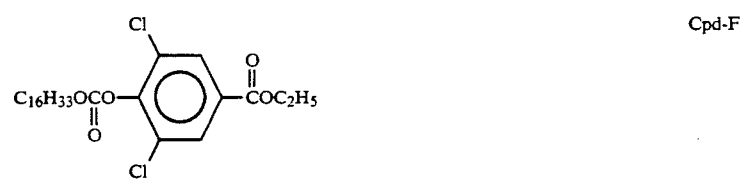
Cpd-F
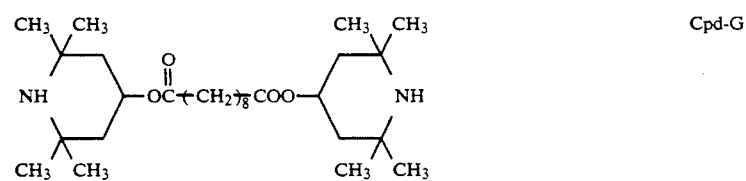
Cpd-G
Cpd-H
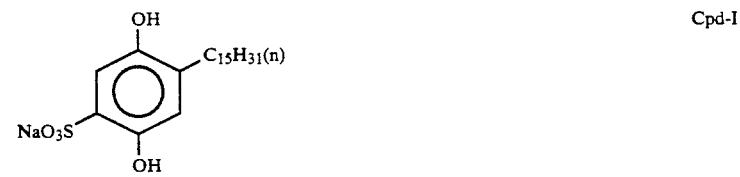
Cpd-I
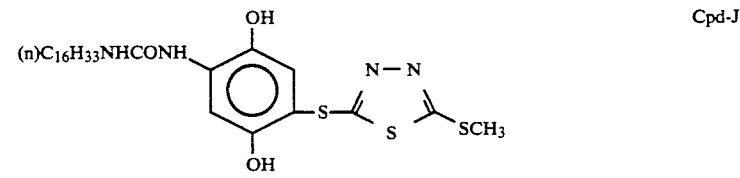
Cpd-J
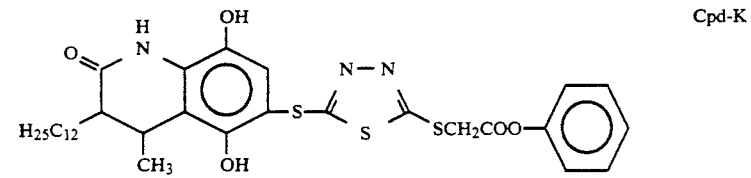
Cpd-K -continued
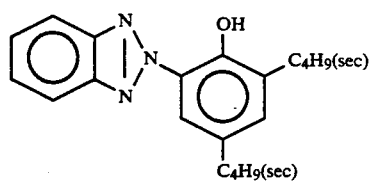 U-1
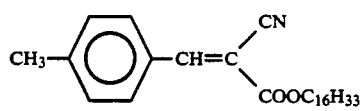 U-2
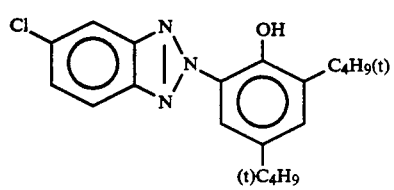 U-3
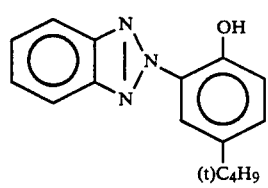 U-4
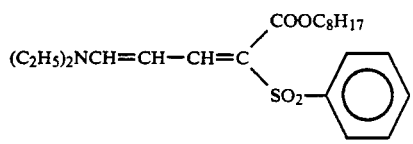 U-5
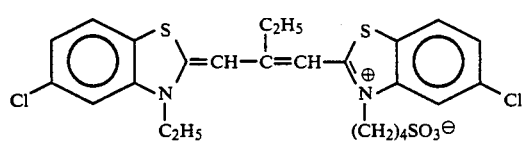 S-1
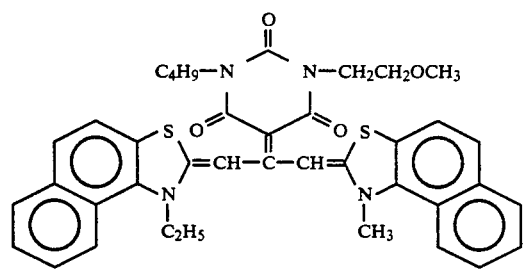 S-2
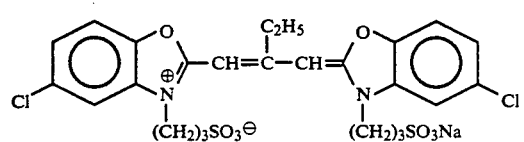 S-3
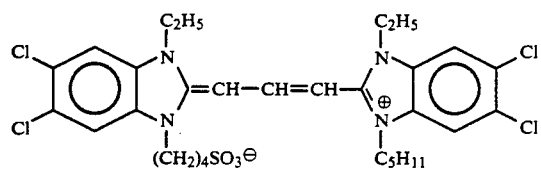 S-4

-continued
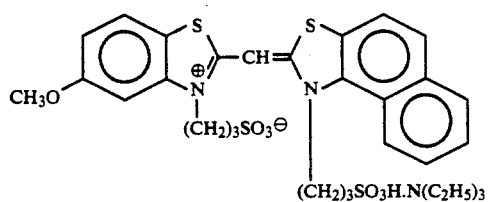 S-5
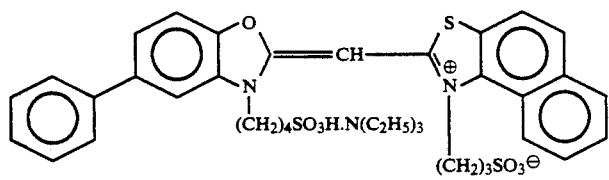 S-6
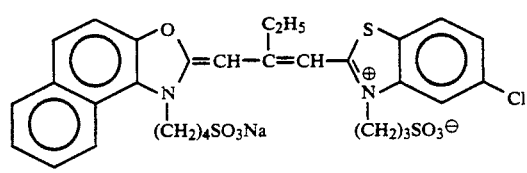 S-7
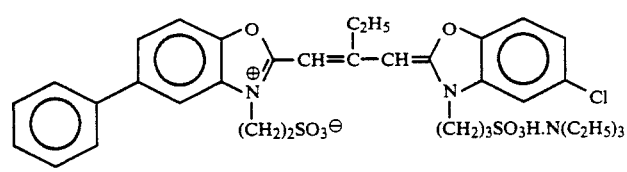 S-8
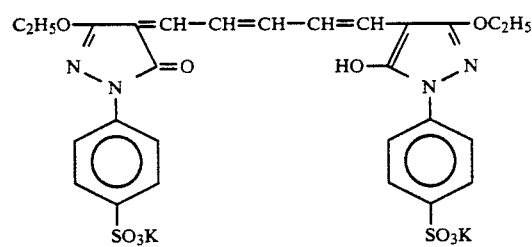 D-1
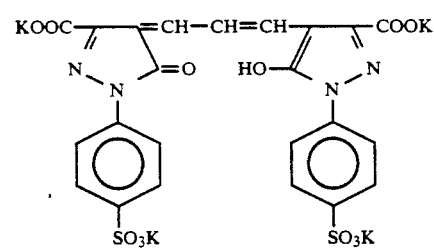 D-2
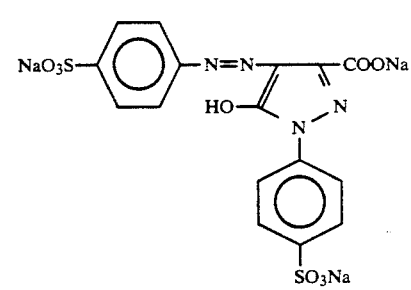 D-3

-continued
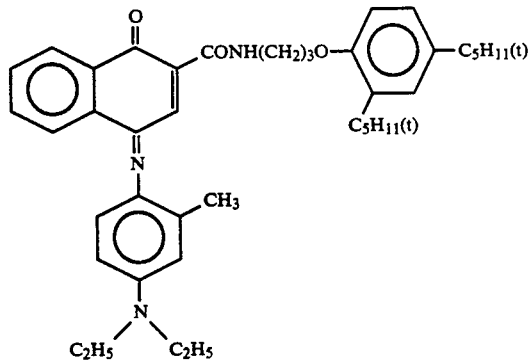
D-4
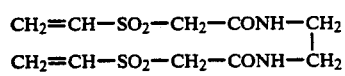
H-1
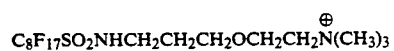
W-1
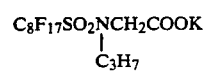
W-2
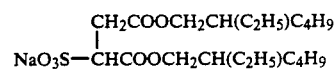
W-3
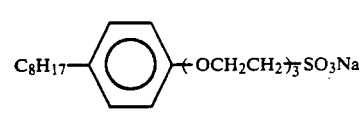
W-4
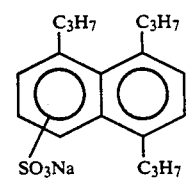
W-5
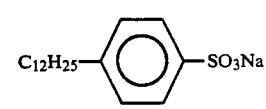
W-6
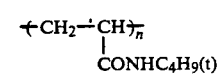
P-1
Number average molecular weight ≈ 15,000
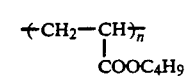
M-1
Number average molecular weight ≈ 154,000
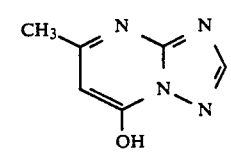
F-1

-continued

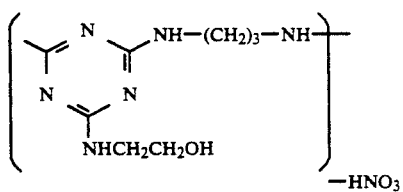
F-2

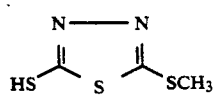
F-3

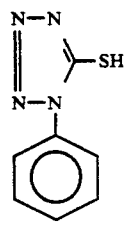
F-4

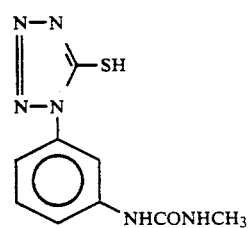
F-5

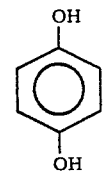
F-6

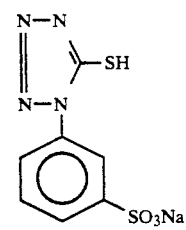
F-7

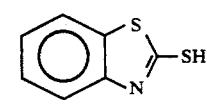
F-8

Preparation of Sample 402

Sample 402 was prepared in the same manner as Sample 401, provided that yellow colloidal silver contained in the thirteenth layer was replaced with a comparative dye A shown below so that a coated amount thereof became $4 \times 10^{-4}$ mole/m$^2$.

In order to coat the comparative dye A, the dispersion thereof was prepared in the following manner to incorporate it into the layer. The dye ($2 \times 10^{-3}$ mole) was put in a ball mill vessel together with water and a surface active agent Alkanol XC (alkylnaphthalenesulfonate, manufactured by Du Pont Co., Ltd.). Then, beads of zirconium oxide were put therein and the vessel was tightly closed, followed by dispersing the mixture in a ball mill for four days. Afterwards, a 10% gelatin solution (50 ml) was added and the above beads were removed, whereby the dispersion was obtained.

Preparation of Samples 403 and 404

Samples 403 and 404 were prepared in the same manner as Sample 402, provided that the comparative dye A was replaced with an equimolar amount of comparative dyes B and C shown below, respectively.

The dispersions thereof were prepared as well in the same manner as Sample 40.

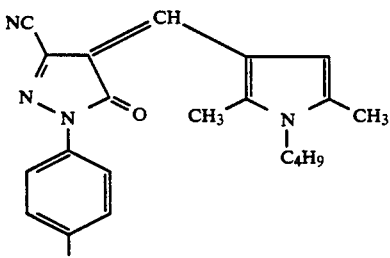

Dye A (Compound described in JP-A-3-144438)

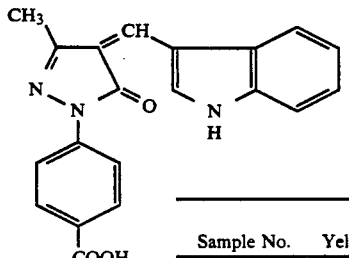

Dye B (Compound described in EP 430186)

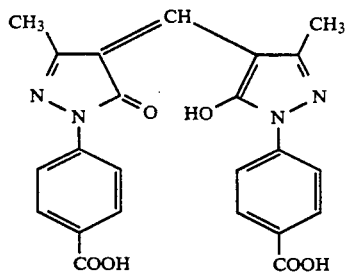

Dye C (Compound described in JP-A-52-92716)

Preparation of Samples 405 to 407

Samples 405 to 407 were prepared in the same manner as Sample 402, provided that the comparative dye A was replaced with an equimolar amount of D-78, D-81 and D-82 of the present invention, respectively.

The dispersions thereof were prepared in the following manner. A dye ($2 \times 10^{-3}$ mole) was dissolved in the mixture of tricresyl phosphate (2.0 g), sodium p-dodecylbenzenesulfonate (0.8 g) and ethyl acetate (20 ml) under heating, and then a 10% gelatin solution (50 ml) was added thereto, followed by emulsifying and dispersing with a high speed rotary homogenizer at 15,000 rpm for ten minutes, whereby the dispersions were obtained.

Samples 401 to 407 thus obtained were exposed to a white light via an optical wedge and then were processed with an automatic developing machine in the following method (C).

The relative sensitivity of the green-sensitive layers was shown in Table 3. Further, a sensitivity reduction of the blue-sensitive layers before and after standing at 40° C. and RH 80% for three days, which was processed in the foregoing method, was measured and shown in Table 3.

The decoloring property of a dye after processing was evaluated by measuring the minimum density (Dmin) of the yellow density. The results thereof are shown in Table 3.

As apparent from the results shown in Table 3, the samples of the present invention are highly sensitive and have an excellent decoloring property as well as a superior storage stability at a high temperature and humidity.

Further, similar results were obtained with the development processing method (D).

TABLE 3

| Sample No. | Yellow filter of 13th layer | Dispersion status | Relative[1] sensitivity | Sensitivity[2] | Minimum[3] density (Dmin) |
|---|---|---|---|---|---|
| 401 (Comp.) | Yellow colloidal silver | Solid crystal | 100 | 100 | 0.11 |
| 402 (Comp.) | Dye A | Solid fine grain | 90 | 90 | 0.12 |
| 403 (Comp.) | Dye B | Solid fine grain | 92 | 93 | 0.13 |
| 404 (Comp.) | Dye C | Solid fine grain | 88 | 86 | 0.11 |
| 405 (Inv.) | | Oil dispersion | 115 | 100 | 0.12 |
| 406 (Inv.) | | Oil dispersion | 118 | 100 | 0.12 |
| 407 (Inv.) | | Oil dispersion | 117 | 100 | 0.12 |

[1] Relative sensitivity of the green-sensitive layers.
[2] Sensitivity of the blue-sensitive layers after standing at 40° C. and RH 80% for three days.
[3] Minimum density of the yellow density.

| Processing method (C) | | | | |
|---|---|---|---|---|
| Processing Step | Time (min) | Temperature (°C.) | Tank capacity (l) | Replenishing amount (ml/m$^2$) |
| 1st developing | 6 | 38 | 12 | 2200 |
| 1st washing | 2 | 38 | 4 | 7500 |
| Reversal | 2 | 38 | 4 | 1100 |
| Color developing | 6 | 38 | 12 | 2200 |
| Controlling | 2 | 38 | 4 | 1100 |
| Bleaching | 6 | 38 | 12 | 220 |
| Fixing | 4 | 38 | 8 | 1100 |
| 2nd washing | 4 | 38 | 8 | 7500 |
| Stabilizing | 1 | 25 | 2 | 1100 |

The compositions of the respective processing solutions are shown below:

| First developing solution | Tank solution | Replenishing solution |
|---|---|---|
| Pentasodium nitrilo-N,N,N-trimethylenephosphonate | 1.5 g | 1.5 g |
| Pentasodium diethylenetriaminepentaacetate | 2.0 g | 2.0 g |
| Sodium sulfite | 30 g | 30 g |
| Hydroquinone.potassium monosulfonate | 20 g | 20 g |
| Potassium carbonate | 15 g | 20 g |
| Sodium bicarbonate | 12 g | 15 g |
| 1-Phenyl-4-methyl-4-hydroxymethyl-3-pyrazolidone | 1.5 g | 2.0 g |
| Potassium bromide | 2.5 g | 1.4 g |
| Potassium thiocyanate | 1.2 g | 1.2 g |
| Potassium iodide | 2.0 mg | — |
| Diethylene glycol | 13 g | 15 g |
| Water to make | 1.0 l | 1.0 l |

-continued

First developing solution

|  | Tank solution | Replenishing solution |
|---|---|---|
| pH | 9.60 | 9.60 | pH was adjusted with hydrochloric acid or potassium hydroxide.

Reversal solution

|  | Tank soln./replenishing solution common |
|---|---|
| Pentasodium nitrilo-N,N,N-trimethylenephosphonate | 3.0 g |
| Stannous chloride dihydrate | 1.0 g |
| p-Aminophenol | 0.1 g |
| Sodium hydroxide | 8 g |
| Glacial acetic acid | 15 ml |
| Water to make | 1.0 liter |
| pH | 6.00 | pH was adjusted with hydrochloric acid or sodium hydroxide.

Color developing solution

|  | Tank solution | Replenishing solution |
|---|---|---|
| Pentasodium nitrilo-N,N,N-trimethylenephosphonate | 2.0 g | 2.0 g |
| Sodium sulfite | 7.0 g | 7.0 g |
| Tripotassium phosphate 12 hydrate | 36 g | 36 g |
| Potassium bromide | 1.0 g | — |
| Potassium iodide | 90 mg | — |
| Sodium hydroxide | 3.0 g | 3.0 g |
| Citrazinic acid | 1.5 g | 1.5 g |
| N-Ethyl-($\beta$-methanesulfonamidoethyl)-3-methyl-4-aminoaniline 3/2 sulfate monohydrate | 11 g | 11 g |
| 3,6-Dithiaoctane-1,8-diol | 1.0 g | 1.0 g |
| Water to make | 1.0 l | 1.0 l |
| pH | 11.80 | 12.00 | pH was adjusted with hydrochloric acid or potassium hydroxide.

Controlling solution

|  | Tank solution | Replenishing solution |
|---|---|---|
| Disodium ethylenediamine tetraacetate dihydrate | 8.0 g | 8.0 g |
| Sodium sulfite | 12 g | 12 g |
| 1-Thioglycerol | 0.4 g | 0.4 g |
| Adduct of formaldehyde and sodium bisulfite | 30 g | 35 g |
| Water to make | 1.0 l | 1.0 l |
| pH | 6.30 | 6.10 | pH was adjusted with hydrochloric acid or sodium hydroxide.

Bleaching solution

|  | Tank solution | Replenishing solution |
|---|---|---|
| Disodium ethylenediamine-teraacetate dihydrate | 2.0 g | 4.0 g |
| Ammonium ethylenediamine-tetraacetato ferrate | 120 g | 240 g |
| dihydrate | | |
| Potassium bromide | 100 g | 200 g |
| Ammonium nitrate | 10 g | 20 g |
| Water to make | 1.0 l | 1.0 l |
| pH | 5.70 | 5.50 | pH was adjusted with hydrochloric acid or sodium hydroxide.

Fixing solution

|  | Tank soln./replenishing solution common |
|---|---|
| Ammonium thiosulfate | 80 g |
| Sodium sulfite | 5.0 g |
| Sodium bisulfite | 5.0 g |
| Water to make | 1.0 l |
| pH | 6.60 | pH was adjusted with hydrochloric acid or ammonia water.

Stabilizing solution

|  | Tank solution | Replenishing solution |
|---|---|---|
| Benzoisothiazoline-3-one | 0.02 g | 0.03 g |
| Polyoxyethylene-p-monononyl-phenyl ether (average polymerization degree: 10) | 0.3 g | 0.3 g |
| Water to make | 1.0 l | 1.0 l |
| pH | 7.0 | 7.0 |

Processing method (D)

| Processing Step | Time (min) | Temperature (°C.) | Tank capacity (l) | Replenishing amount (ml/m$^2$) |
|---|---|---|---|---|
| 1st developing | 6 | 38 | 12 | 2200 |
| 1st washing | 0.75 | 38 | 2 | 2200 |
| Reversal | 0.75 | 38 | 2 | 1100 |
| Color developing | 6 | 38 | 12 | 2200 |
| Bleaching | 2 | 38 | 4 | 860 |
| Bleach/fixing | 4 | 38 | 8 | 1100 |
| 2nd washing (1) | 1 | 38 | 2 | — |
| 2nd washing (2) | 1 | 38 | 2 | 1100 |
| Stabilizing | 1 | 25 | 2 | 1100 |
| Drying | 1 | 65 | — | — |

Replenishing of the second washing was carried out by a so-called counter-current replenishing method in which a replenishing solution was introduced into the second washing bath (2) and the overflowed solution of the second washing bath (2) was introduced into the second washing bath (1).

The compositions of the respective processing solutions are shown below:

First developing solution

|  | Tank solution | Replenishing solution |
|---|---|---|
| Pentasodium nitrilo-N,N,N-trimethylenephosphonate | 2.0 g | 2.0 g |
| Sodium sulfite | 30 g | 30 g |
| Hydroquinone.potassium monosulfonate | 20 g | 20 g |
| Potassium carbonate | 33 g | 33 g |
| 1-Phenyl-4-methyl-4-hydroxymethyl-3-pyrazolidone | 2.0 g | 2.0 g |

First developing solution

| | Tank solution | Replenishing solution |
|---|---|---|
| Potassium bromide | 2.5 g | 1.4 g |
| Potassium thiocyanate | 1.2 g | 1.2 g |
| Potassium iodide | 2.0 mg | — |
| Water to make | 1.0 l | 1.0 l |
| pH | 9.60 | 9.60 | pH was adjusted with hydrochloric acid or potassium hydroxide.

First washing solution

| | Tank soln./replenishing solution common |
|---|---|
| Ethylenediaminetetramethylenephosphonic acid | 2.0 g |
| Disodium phosphate | 5.0 g |
| Water to make | 1.0 l |
| pH | 7.00 | pH was adjusted with hydrochloric acid or sodium hydroxide.

Reversal solution

| | Tank soln./replenishing solution common |
|---|---|
| Pentasodium nitrilo-N,N,N-trimethylenephosphonate | 3.0 g |
| Stannous chloride dihydrate | 1.0 g |
| p-Aminophenol | 0.1 g |
| Sodium hydroxide | 8 g |
| Glacial acetic acid | 15 ml |
| Water to make | 1.0 l |
| pH | 6.00 | pH was adjusted with hydrochloric acid or sodium hydroxide.

Color developing solution

| | Tank solution | Replenishing solution |
|---|---|---|
| Pentasodium nitrilo-N,N,N-trimethylenephosphonate | 2.0 g | 2.0 g |
| Sodium sulfite | 7.0 g | 7.0 g |
| Trisodium phosphate 12 hydrate | 36 g | 36 g |
| Potassium bromide | 1.0 g | — |
| Potassium iodide | 90 mg | — |
| Sodium hydroxide | 3.0 g | 3.0 g |
| Citrazinic acid | 1.5 g | 1.5 g |
| N-Ethyl-N-($\beta$-methanesulfonamidoethyl)-3-methyl-4-aminoaniline 3/2 sulfate | 11 g | 11 g |
| 3,6-Dithiaoctane-1,8-diol | 1.0 g | 1.0 g |
| Water to make | 1.0 l | 1.0 l |
| pH | 11.80 | 12.00 | pH was adjusted with hydrochloric acid or potassium hydroxide.

Bleaching solution

| | Tank soln./replenishing solution common |
|---|---|
| Disodium ethylenediaminetetraacetate dihydrate | 10.0 g |
| Ammonium ethylenediaminetetraacetato ferrate dihydrate | 120 g |
| Potassium bromide | 100 g |
| Ammonium nitrate | 10 g |
| Bleaching accelerator $(CH_3)_2N-CH_2-CH_2-S-S-CH_2-CH_2-N(CH_3)_2 \cdot 2HCl$ | 0.005 mole |
| Water to make | 1.0 l |
| pH | 6.30 | pH was adjusted with hydrochloric acid or ammonia water.

Bleach/fixing solution

| | Tank soln./replenishing solution common |
|---|---|
| Disodium ethylenediaminetetraacetate dihydrate | 5.0 g |
| Ammonium ethylenediaminetetraacetato ferrate dihydrate | 50 g |
| Ammonium thiosulfate | 80 g |
| Sodium sulfite | 12.0 g |
| Water to make | 1.0 l |
| pH | 6.60 |

City water was introduced into a mixed-bed type column filled with H type strong acidic cation exchange resins (Amberlite IR-120B manufactured by Rohm & Haas Co., Ltd.) and OH type strong base anion exchange resins (Amberlite IR-400 manufactured by Rohm & Haas Co., Ltd.) to reduce the ion concentrations of calcium and magnesium to 3 mg/liter or less, and subsequently sodium dichloroisocyanurate (20 mg/liter) and sodium sulfate (1.5 g/liter) were added. The pH range of this solution was 6.5 to 7.5.

Stabilizing solution

| | Tank soln./replenishing solution common |
|---|---|
| Formalin (37%) | 0.5 ml |
| Polyoxyethylene-p-monononylphenyl ether (average polymerization degree: 10) | 0.3 g |
| Triazole | 1.7 g |
| Piperazine 6 hydrate | 0.6 g |
| Water to make | 1.0 l |
| pH | not controlled |

While the invention has been described in detail and with reference to specific embodiments thereof, it will be apparent to one skilled in the art that various changes and modifications can be made therein without departing from the spirit and scope thereof.

What is claimed is:

1. A silver halide photographic light-sensitive material comprising a support and provided thereon at least one layer containing at least one compound represented by the following formula (1):

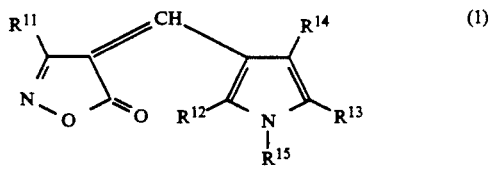

wherein $R^{11}$ represents a hydrogen atom, an alkyl group, an aryl group, $-COOR^{16}$, or $-CONR^{16}R^{17}$; $R^{12}$, $R^{13}$ and $R^{14}$ each represents a hydrogen atom, an alkyl group, and an aryl group; $R^{15}$ represents a hydrogen atom, an alkyl group, an aryl group, or an amino group; $R^{13}$ and $R^{14}$ may be combined to form a 6-membered ring; and $R^{16}$ and $R^{17}$ each represents a hydrogen atom, an alkyl group, and an aryl group; provided that the compound represented by formula (1) does not have a carboxy group or a salt thereof as a substituent.

2. The light-sensitive material of claim 1, wherein the compound of formula (1) is a compound represented by formula (2):

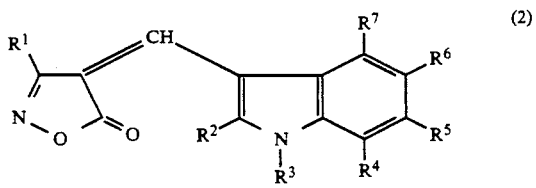

wherein $R^1$ represents an alkyl group or an aryl group; $R^2$ represents an alkyl group, an aryl group or a hydrogen atom; $R^3$ represents a hydrogen atom or an alkyl group; $R^4$, $R^5$, $R^6$ and $R^7$ each represents a hydrogen atom, an alkyl group, an aryl group, a halogen atom, $-OR^{21}$, $-NR^{21}R^{22}$, $-N(R^{21})SO_2R^{22}$, $-N(R^{21})COR^{22}$, and $-COOR^{21}$; and $R^{21}$ and $R^{22}$ each represents a hydrogen atom, an alkyl group and an aryl group; provided that the compound represented by formula (2) does not have a carboxy group or a salt thereof as a substituent.

3. The light-sensitive material of claim 2, wherein the compound of formula (2) is a compound represented by formula (3):

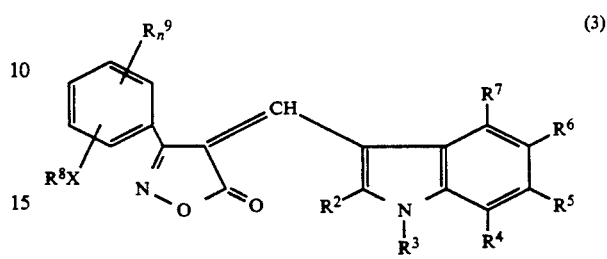

wherein $R^2$, $R^3$, $R^4$, $R^5$, $R^6$ and $R^7$ each represents the same groups as those defined for $R^2$, $R^3$, $R^4$, $R^5$, $R^6$ and $R^7$ in formula (2); X represents $-SO_2NH-$, $-SO_2NHCO-$, $-CONHCO-$, or $-SO_2NHSO_2-$; $R^8$ represents an alkyl group, an aryl group or a heterocyclic group; $R^9$ represents a hydrogen atom, an alkyl group, an aryl group, $-OR^{23}$, $-NR^{23}R^{24}$, $-N(R^{23})COR^{24}$, or $-COOR^{23}$; and $R^{23}$ and $R^{24}$ each represents a hydrogen atom, an alkyl group and an aryl group; provided that the compound represented by formula (3) does not have a carboxy group or a salt thereof as a substituent.

4. The light-sensitive material of claim 1, wherein the compound represented by formula (1) is substituted with a group having a dissociative proton.

5. The light-sensitive material of claim 1, comprising a hydrophilic colloid layer containing at least one compound represented by formula (1) as an oil composition and/or a polymer latex composition.

6. The light-sensitive material of claim 5, comprising each at least one red-sensitive layer, green-sensitive layer, blue-sensitive layer and light-insensitive layer, wherein said light-insensitive layer is a yellow filter layer containing at least one compound represented by formula (1) as an oil composition and/or a polymer latex composition.

* * * * *